(12) United States Patent
Ahmed et al.

(10) Patent No.: US 7,984,474 B2
(45) Date of Patent: Jul. 19, 2011

(54) METHOD AND APPARATUS FOR A DIGITIZED CATV NETWORK FOR BUNDLED SERVICES

(75) Inventors: Sherjil Ahmed, Irvine, CA (US); Imtinan Elahi, Richardson, TX (US)

(73) Assignee: Quartics, Inc., Irvine, CA (US)

( * ) Notice: Subject to any disclaimer, the term of this patent is extended or adjusted under 35 U.S.C. 154(b) by 1073 days.

(21) Appl. No.: 10/314,873

(22) Filed: Dec. 9, 2002

(65) Prior Publication Data

US 2005/0114903 A1 May 26, 2005

Related U.S. Application Data

(63) Continuation of application No. 09/510,166, filed on Feb. 22, 2000, now Pat. No. 6,519,773.

(60) Provisional application No. 60/181,133, filed on Feb. 8, 2000.

(51) Int. Cl.
*H04N 7/173* (2006.01)
(52) U.S. Cl. ............ 725/119; 725/82; 725/95; 725/148; 725/149
(58) Field of Classification Search .................. 725/148, 725/149, 119, 152
See application file for complete search history.

(56) References Cited

U.S. PATENT DOCUMENTS

| | | | |
|---|---|---|---|
| 3,931,473 A | 1/1976 | Ferris, Jr. | |
| 3,995,144 A | 11/1976 | Johnson et al. | |
| 4,032,972 A | 6/1977 | Saylor | |
| 4,077,006 A | 2/1978 | Nicholson | |
| 4,081,831 A | 3/1978 | Tang et al. | |

(Continued)

FOREIGN PATENT DOCUMENTS

DE 3707243 9/1988

(Continued)

OTHER PUBLICATIONS

Akos et al., Jul. 1999, IEEE Transactions on Communications, 47:983-988, "Direct Bandpass Sampling of Multiple Distinct RF Signals".

(Continued)

*Primary Examiner* — Christopher Kelley
*Assistant Examiner* — Timothy R Newlin
(74) *Attorney, Agent, or Firm* — Novel IP

(57) ABSTRACT

A cost-efficient digital CATV network to improve signal quality, provide reliability, and offer the ability to meet demands for interactive services is described. Analog or digital video downstream channels are converted to a digital format by a digital headend transmitter. Relatively costly error-encoding for digital video channels is also part of the digital headend transmitter. Downstream analog and digital video channels in the digital format are transmitted using time-division multiplex technology from a headend to nodes using standard network protocols, such as SONET. Standard network protocols provide error-monitoring and status indication of transmit data, thus ensuring high signal quality and reliability. Time-division multiplexing facilitates easy adding or dropping of information to a transmit path. Flexibility to add or drop information is critical in providing interactive services. Data from interactive services can be added or dropped at points of presence throughout the digital CATV network. Subscribers to the digital CATV network can communicate with each other. A digital node transmitter receives the analog or digital video channels in digital format and converts the analog or digital video channels into an analog format. The digital node transmitter also frequency-division multiplexes multiple analog or digital video channels into one analog broadband signal for broadcast to subscribers' homes.

18 Claims, 15 Drawing Sheets

U.S. PATENT DOCUMENTS

| | | |
|---|---|---|
| 4,112,488 A | 9/1978 | Smith, III |
| 4,244,046 A | 1/1981 | Brouard et al. |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,290,142 A | 9/1981 | Schnee et al. |
| 4,354,167 A | 10/1982 | Terreault et al. |
| 4,367,557 A | 1/1983 | Stern et al. |
| 4,402,076 A | 8/1983 | Krajewski |
| 4,404,514 A | 9/1983 | Reichert |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,477,799 A | 10/1984 | Rocci |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,531,239 A | 7/1985 | Usui |
| 4,533,948 A | 8/1985 | McNamara et al. |
| 4,536,791 A | 8/1985 | Campbell et al. |
| 4,538,174 A | 8/1985 | Gargini et al. |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,616,214 A | 10/1986 | Naito |
| 4,616,263 A | 10/1986 | Eichelberger |
| 4,627,105 A | 12/1986 | Ohashi et al. |
| 4,633,462 A | 12/1986 | Stifle et al. |
| 4,695,880 A | 9/1987 | Johnson et al. |
| 4,706,121 A | 11/1987 | Young |
| 4,709,418 A | 11/1987 | Fox et al. |
| 4,710,971 A | 12/1987 | Nozaki et al. |
| 4,748,689 A | 5/1988 | Mohr |
| 4,754,451 A | 6/1988 | Eng et al. |
| 4,760,442 A | 7/1988 | O'Connell et al. |
| 4,769,833 A | 9/1988 | Farleigh et al. |
| 4,769,838 A | 9/1988 | Hasegawa |
| 4,801,190 A | 1/1989 | Imoto |
| 4,816,825 A | 3/1989 | Chan et al. |
| 4,821,102 A | 4/1989 | Ichikawa et al. |
| 4,823,386 A | 4/1989 | Dumbauld et al. |
| 4,827,253 A | 5/1989 | Maltz |
| 4,829,372 A | 5/1989 | McCalley et al. |
| 4,847,700 A | 7/1989 | Freeman |
| 4,860,379 A | 8/1989 | Schoeneberger et al. |
| 4,891,694 A | 1/1990 | Way |
| 4,901,367 A | 2/1990 | Nicholson |
| 4,903,126 A | 2/1990 | Kassatly |
| 4,912,760 A | 3/1990 | West, Jr. et al. |
| 4,918,516 A | 4/1990 | Freeman |
| 4,920,533 A | 4/1990 | Dufresne et al. |
| 4,922,532 A | 5/1990 | Farmer et al. |
| 4,933,935 A | 6/1990 | Adams |
| 4,941,040 A | 7/1990 | Pocock et al. |
| 4,947,244 A | 8/1990 | Fenwick et al. |
| 4,959,829 A | 9/1990 | Griesing |
| 4,963,995 A | 10/1990 | Lang |
| 4,975,771 A | 12/1990 | Kassatly |
| 4,994,909 A | 2/1991 | Graves et al. |
| 4,995,078 A | 2/1991 | Monslow et al. |
| 5,008,934 A | 4/1991 | Endoh |
| 5,014,125 A | 5/1991 | Pocock et al. |
| 5,027,400 A | 6/1991 | Baji et al. |
| 5,057,917 A | 10/1991 | Shalkauser et al. |
| 5,060,262 A | 10/1991 | Bevins, Jr et al. |
| 5,093,718 A | 3/1992 | Hoarty et al. |
| 5,109,414 A | 4/1992 | Harvey et al. |
| 5,119,188 A | 6/1992 | McCalley et al. |
| 5,130,792 A | 7/1992 | Tindell et al. |
| 5,132,992 A | 7/1992 | Yurt et al. |
| 5,133,079 A | 7/1992 | Ballantyne et al. |
| 5,136,410 A | 8/1992 | Heiling et al. |
| 5,138,440 A | 8/1992 | Radice |
| 5,198,989 A | 3/1993 | Petroff |
| 5,208,665 A | 5/1993 | McCalley et al. |
| 5,231,494 A | 7/1993 | Wachob |
| 5,272,700 A | 12/1993 | Hansen et al. |
| 5,341,216 A | 8/1994 | Hoffart |
| 5,361,091 A * | 11/1994 | Hoarty et al. .................. 725/119 |
| 5,412,720 A * | 5/1995 | Hoarty ........................... 380/211 |
| 5,442,700 A | 8/1995 | Snell et al. |
| 5,446,919 A | 8/1995 | Wilkins |
| 5,461,619 A | 10/1995 | Citta et al. |
| 5,469,431 A | 11/1995 | Wendorf et al. |
| 5,469,495 A | 11/1995 | Beveridge |
| 5,469,545 A | 11/1995 | Vanbuskirk et al. |
| 5,515,511 A | 5/1996 | Nguyen et al. |
| 5,541,757 A | 7/1996 | Fuse et al. |
| 5,557,319 A | 9/1996 | Gurusami et al. |
| 5,579,239 A | 11/1996 | Freeman et al. |
| 5,583,561 A | 12/1996 | Baker et al. |
| 5,586,121 A | 12/1996 | Moura et al. |
| 5,587,734 A | 12/1996 | Lauder et al. |
| 5,592,470 A | 1/1997 | Rudrapatna et al. |
| 5,594,490 A | 1/1997 | Dawson et al. |
| 5,621,786 A | 4/1997 | Fischer et al. |
| 5,630,204 A | 5/1997 | Hylton et al. |
| 5,631,757 A | 5/1997 | Bodeep et al. |
| 5,675,732 A | 10/1997 | Majeti et al. |
| 5,680,130 A | 10/1997 | Tsutsui et al. |
| 5,682,195 A | 10/1997 | Hendricks et al. |
| 5,696,765 A | 12/1997 | Safadi |
| 5,717,617 A * | 2/1998 | Chester ........................ 708/313 |
| 5,729,370 A | 3/1998 | Bernstein et al. |
| 5,734,589 A | 3/1998 | Kostreski et al. |
| 5,745,837 A | 4/1998 | Fuhrmann |
| 5,754,552 A | 5/1998 | Allmond et al. |
| 5,765,097 A | 6/1998 | Dail |
| 5,765,099 A | 6/1998 | Georges et al. |
| 5,768,682 A | 6/1998 | Peyrovian |
| 5,774,789 A | 6/1998 | Van der Kaay et al. |
| 5,777,544 A | 7/1998 | Vander Mey et al. |
| 5,778,187 A | 7/1998 | Monteiro et al. |
| 5,790,806 A | 8/1998 | Koperda |
| 5,799,151 A | 8/1998 | Hoffer |
| 5,805,203 A | 9/1998 | Horton |
| 5,812,928 A * | 9/1998 | Watson et al. ................. 725/118 |
| 5,818,446 A | 10/1998 | Bertram et al. |
| 5,818,511 A | 10/1998 | Farry |
| 5,822,324 A | 10/1998 | Kostreski |
| 5,822,530 A | 10/1998 | Brown |
| 5,828,677 A | 10/1998 | Sayeed et al. |
| 5,838,989 A | 11/1998 | Hutchison et al. |
| 5,841,468 A | 11/1998 | Wright |
| 5,859,895 A | 1/1999 | Pomp et al. |
| 5,861,919 A | 1/1999 | Perkins et al. |
| 5,864,672 A | 1/1999 | Bodeep et al. |
| 5,864,748 A | 1/1999 | Dail |
| 5,867,485 A | 2/1999 | Chambers et al. |
| 5,872,810 A | 2/1999 | Philips et al. |
| 5,878,325 A | 3/1999 | Dail |
| 5,880,864 A | 3/1999 | Williams et al. |
| 5,881,363 A | 3/1999 | Ghosh et al. |
| 5,886,995 A | 3/1999 | Arsenault et al. |
| 5,920,700 A | 7/1999 | Gordon et al. |
| 5,930,231 A * | 7/1999 | Miller et al. ................... 370/210 |
| 5,930,262 A | 7/1999 | Sierens et al. |
| 5,940,738 A | 8/1999 | Rao |
| 5,946,622 A | 8/1999 | Bojeryd |
| 5,953,311 A | 9/1999 | Davies |
| 5,963,844 A | 10/1999 | Dail |
| 5,986,691 A | 11/1999 | Henderson |
| 5,987,061 A | 11/1999 | Chen |
| 5,987,303 A | 11/1999 | Dutta et al. |
| 5,990,927 A | 11/1999 | Hendricks et al. |
| 5,999,797 A | 12/1999 | Zancho et al. |
| 5,999,970 A | 12/1999 | Krisbergh |
| 6,011,950 A | 1/2000 | Young |
| 6,012,068 A | 1/2000 | Boezeman et al. |
| 6,026,088 A | 2/2000 | Rostoker |
| 6,034,678 A | 3/2000 | Hoarty et al. |
| 6,041,056 A | 3/2000 | Bigham |

| | | | |
|---|---|---|---|
| 6,091,932 A | 7/2000 | Langlais | |
| RE36,801 E | 8/2000 | Logan et al. | |
| 6,104,700 A | 8/2000 | Haddock et al. | |
| 6,112,086 A | 8/2000 | Wala | |
| 6,112,206 A | 8/2000 | Morris et al. | |
| 6,148,006 A | 11/2000 | Dyke et al. | |
| 6,163,537 A | 12/2000 | Thacker | |
| 6,181,687 B1 | 1/2001 | Bisdikian | |
| 6,240,533 B1 | 5/2001 | Slemmer | |
| 6,253,375 B1 | 6/2001 | Gordon et al. | |
| 6,260,043 B1 | 7/2001 | Puri et al. | |
| 6,282,683 B1 | 8/2001 | Dapper et al. | |
| 6,285,685 B1 | 9/2001 | Bum | |
| 6,305,019 B1 | 10/2001 | Dyer | |
| 6,313,874 B1 | 11/2001 | Bowyer | |
| 6,345,038 B1 | 2/2002 | Selinger | |
| 6,345,239 B1 | 2/2002 | Bowman-Amuah | |
| 6,356,369 B1 | 3/2002 | Farhan | |
| 6,370,571 B1 | 4/2002 | Medin | |
| 6,377,782 B1 | 4/2002 | Bishop et al. | |
| 6,377,981 B1 | 4/2002 | Ollikainen et al. | |
| 6,381,244 B1 | 4/2002 | Nishimura et al. | |
| 6,385,606 B2 | 5/2002 | Inohara et al. | |
| 6,408,333 B1 | 6/2002 | St. Clair | |
| 6,414,958 B1 | 7/2002 | Specht | |
| 6,442,599 B1 | 8/2002 | DuLac et al. | |
| 6,449,071 B1 * | 9/2002 | Farhan et al. | 398/79 |
| 6,452,935 B1 | 9/2002 | Gibbs | |
| 6,463,585 B1 | 10/2002 | Hendricks | |
| 6,473,858 B1 | 10/2002 | Shimomura et al. | |
| 6,480,748 B1 | 11/2002 | Gerszberg et al. | |
| 6,490,727 B1 | 12/2002 | Nazarathy et al. | |
| 6,516,350 B1 | 2/2003 | Lumelsky et al. | |
| 6,519,243 B1 | 2/2003 | Nonaka et al. | |
| 6,526,575 B1 | 2/2003 | McCoy et al. | |
| 6,574,193 B1 | 6/2003 | Kinrot | |
| 6,577,414 B1 | 6/2003 | Feldman et al. | |
| 6,577,642 B1 | 6/2003 | Fijolek et al. | |
| 6,591,422 B1 | 7/2003 | Cesar et al. | |
| 6,609,148 B1 | 8/2003 | Salo et al. | |
| 6,625,116 B1 * | 9/2003 | Schneider et al. | 370/226 |
| 6,647,073 B2 * | 11/2003 | Tapio | 375/297 |
| 6,654,347 B1 | 11/2003 | Wiedeman et al. | |
| 6,658,010 B1 | 12/2003 | Enns et al. | |
| 6,665,726 B1 | 12/2003 | Leighton et al. | |
| 6,671,741 B1 | 12/2003 | Dillon | |
| 6,674,994 B1 | 1/2004 | Fell et al. | |
| 6,675,386 B1 | 1/2004 | Hendricks et al. | |
| 6,691,274 B1 | 2/2004 | Olds et al. | |
| 6,697,360 B1 | 2/2004 | Gai et al. | |
| 6,718,552 B1 * | 4/2004 | Goode | 725/95 |
| 6,741,841 B1 | 5/2004 | Mitchell | |
| 6,751,673 B2 | 6/2004 | Shaw | |
| 6,778,494 B1 | 8/2004 | Mauger | |
| 6,785,704 B1 | 8/2004 | McCanne | |
| 6,792,615 B1 | 9/2004 | Rowe et al. | |
| 6,801,911 B1 | 10/2004 | Berstis | |
| 6,819,658 B1 | 11/2004 | Agarwal | |
| 6,820,132 B1 | 11/2004 | Puente et al. | |
| 6,909,726 B1 | 6/2005 | Sheeran | |
| 6,965,593 B2 | 11/2005 | Donahue et al. | |
| 7,031,335 B1 | 4/2006 | Donohue et al. | |
| 2001/0009014 A1 | 7/2001 | Savage et al. | |
| 2001/0025377 A1 | 9/2001 | Hinderks | |
| 2001/0027493 A1 | 10/2001 | Wallace | |
| 2002/0007492 A1 | 1/2002 | Smyth | |
| 2002/0069416 A1 | 6/2002 | Stiles | |
| 2002/0118638 A1 | 8/2002 | Donahue et al. | |

FOREIGN PATENT DOCUMENTS

| | | |
|---|---|---|
| EP | 0 449 633 | 10/1991 |
| EP | 0 477 786 | 4/1992 |
| EP | 0 664 621 | 7/1995 |
| EP | 0713347 | 5/1996 |
| EP | 0 727 883 | 8/1996 |
| GB | 2 248 955 | 4/1992 |
| WO | WO 90/13972 | 11/1990 |
| WO | WO 95/12284 | 5/1995 |
| WO | WO 96/24989 | 8/1996 |
| WO | WO 96/37983 | 11/1996 |
| WO | WO 97/01244 | 1/1997 |
| WO | WO 98/31114 | 7/1998 |
| WO | WO-99/09741 | 2/1999 |
| WO | WO-99/16247 | 4/1999 |
| WO | PCT/US01/02109 | 1/2001 |

OTHER PUBLICATIONS

"Creating a Network for Interactivity", IEEE Spectrum, IEEE Inc., New York, US, vol. 32, No. 4, Apr. 1995, pp. 58-63, XP000506858, ISSN: 0018-9235.

"Adaptive Digital Access Protocol: A MAC Protocol for Multiservice Broadband Access Networks," Dail et al, IEEE Communications Magazine, 34(3), 104-112, Mar. 1, 1996.

"Proposal for a Hub Controlled Cable Television System Using Optical Fiber"; Schrock, Clifford et al.; IEEE Trans On CATV vol. 4 No. 2 Apr. 1979; pp. 70-77.

Tamitani et al., "An Encoder/Decoder Chip Set for the MPEG Video Standard", 1992 IEEE International Conference on Acoustics, vol. 5, Mar. 1992, San Francisco, Calif.

Le Gall, Didier, "MPEG: A Video Compression Standard for Multimedia Applications", Communication of the ACM, vol. 34, No. 4, Apr. 1991, New York, N.Y.

Cable Television Laboratories, Inc., Interim Specification, "Data-Over-Cable Service Interface Specifications, Radio Frequency Interface Specification, SP-RFIv1.1-I02-990731," Jul. 30, 1999, 352 pages.

Stephen D. Dukes; Converging Video, Voice, and High-Speed Data; Communications Engineering & Design, Dec. 1999, pp. 1-7.

Bill Zornow; Migrating New Services Over Sonet; Communications Engineering & Design, Jun. 1999, pp. 1-4.

Craig Kuhl; Wrestling With Return Path Realities; Communications Engineering & Design, Apr. 1999, pp. 1-4.

Jeyhan Karaoguz, Ph.D.; Evaluating Upstream Modulation Techniques; Communications Engineering & Design, Oct. 1998, pp. 1-6.

Dana Cervenka; The Great Sonet Debate: Primed For Video; Communications Engineering & Design, Sep. 1997, pp. 1-6.

Donald Raskin, et al.; Regional Networks For Broadband Cable Television Operations; www.gi.com/white paper/regnet.pdf; Aug. 1998.

Mukta Kar, et al.; Cable Headend Architecture for Delivery of Multimedia Services; 1999 NCTA Technical Papers, pp. 1-10.

Oleh Sniezko; Reverse Path for Advanced Services—Architecture and Technology; 1999 NCTA Technical Papers, pp. 11-19.

Oleh Sniezko, et al.; HFC Architecture In The Making; 1999 NCTA Technical Papers, pp. 20-30.

John Decker; New Generation Non-Compressed Digital Transport Technologies Are Changing The Scope of Today's Broadband Networks; 1999 NCTA Technical Papers, pp. 31-36.

Gary H. Arlen; The Last Five Meters—Five Factors for Home Networking; 1999 NCTA Technical Papers, p. 37.

Farr Farhan; Digitized Return Path: Extending the Applicability of Hybrid-Fiber Coax Architectures for Full-Service Networks; 1999 NCTA Technical Papers, pp. 303-310.

Dr. Robert L. Howald; Advancing Return Technology . . . Bit by Bit; 1999 NCTA Technical Papers, pp. 311-331.

Eric Schnettler; Testing The Return Path; Communications Engineering & Design, Jul. 1998, pp. 1-7.

Oleh Sniezko, et al.; How Much "F" and "C" in HFC; Proceedings of Conference On Emerging Technologies, Jan. 2000.

Cadant; Cable Modems; www.webproforum.com/acrobat/cable.sub.-mod.pdf; Nov. 1999.

* cited by examiner

METHOD AND APPARATUS FOR A DIGITIZED CATV NETWORK FOR BUNDLED SERVICES

RELATED APPLICATION

The present application is a continuation of U.S. patent application Ser. No. 09/510,166, filed Feb. 22, 2000 which issued as U.S. Pat. No. 6,519,773, which claims priority to provisional application entitled METHOD AND APPARATUS FOR A DIGITIZED CATV NETWORK FOR BUNDLED SERVICES, application Ser. No. 60-181-133, filed Feb. 8, 2000, which is hereby incorporated by reference.

BACKGROUND OF THE INVENTION

1. Field of the Invention

This invention relates generally to digital signal processing and digital networks, and more specifically to distribution of signals over a digital cable television network.

2. Description of the Related Art

There is a growing demand for a cable television (CATV) network to support a wide variety of services: analog video, digital video, interactive video, high-speed data access, telephony, and telemetry. Bundled services, supplying multiple services simultaneously, are desired. In order to meet the demand, the CATV network must be able to offer high signal quality over long distances, offer flexibility in adding or dropping services, provide network reliability, and provide cost efficiency.

Presently, information gathering equipment resides in a headend. Equipment used to process the gathered information and configure the information for reception by subscribers also resides in the headend. In a typical CATV network, information from various sources, including satellite or video feed is received at the headend for broadcast in the CATV network. The information received may be legacy analog video channels operating at an Intermediate Frequency (IF) or digitally encoded video channels (e.g., Moving Picture Experts Group (MPEG) data). CATV broadcast signals are transmitted from the headend to subscribers in an analog format over a designated frequency bandwidth. A transmitter at the headend frequency-division multiplexes the video channels before broadcasting to multiple nodes. Each analog video channel is modulated onto its designated radio frequency carrier. The digital bitstream of each digital video channel is error-encoded, modulated, and converted to an analog signal before modulation onto its designated radio frequency carrier.

The analog nature of the broadcast signal limits the transmission distance from the headend to the nodes being served. The CATV network is typically a Hybrid-Fiber-Coax (HFC) system. The broadcast signal is often transmitted from the headend to the nodes using fiber optic cables. The broadcast signal is transmitted from the node to subscribers using coaxial cables. The quality of the analog signal can be sufficiently maintained in the range of 65 kilometers of fiber optic cable. Inherent non-linear characteristics, transmission of multiple channels simultaneously, and noise generated throughout the CATV network significantly degrade the analog signal beyond the 65 kilometers range limit.

An alternate architecture for the CATV network is a Multiplexed Fiber Passive Coax (MFPC) system. In the MFPC system, the broadcast signal is first transmitted from the headend to mux fiber nodes. The broadcast signal is then transmitted from the mux fiber nodes to mini fiber nodes. Both transmissions use fiber optic cables. The broadcast signal is transmitted from the mini fiber nodes to subscribers using coaxial cables. The mini fiber nodes function similarly to the nodes in the HFC system. However, each node typically services a heavier load (e.g., 500 to 2000 subscribers) in comparison to each mini fiber node (e.g., 50 to 80 subscribers). The MFPC system is an improvement over the HFC system. The MFPC system uses shorter coaxial cables to transmit signals from the fiber system to the subscriber. Shorter coaxial cables result in increased bandwidth capacity. Amplifiers in the coaxial cable transmission path are eliminated. Power can be delivered to subscriber equipment via the coaxial cables.

The present CATV network, using either the HFC or the MFPC system, is an open-loop system. The broadcast signals in an analog format are sent from the headend to the nodes, which in turn send the signals to the subscribers. The quality of the signal is not known until it reaches the subscriber. Errors caused by distortion, noise, or faulty equipment are not automatically monitored. The current CATV network is 95% reliable. However, interactive services require 99.9% reliability.

SUMMARY OF THE INVENTION

The present invention solves these and other problems by providing a cost-effective and flexible digital CATV network wherein a headend transmitter receives signals and produces a digital signal in a digital format and a node transmitter receives the digital signal in the digital format and produces an output in an analog format. In the existing CATV networks, signals are transmitted in the analog format.

In the digital CATV network, video signals are in a digital format for transmission from a headend to nodes in a cable distribution system. The nodes convert the digital data to an analog format for distribution to subscribers. Subscribers include homes, schools, businesses, and government agencies. In this application, the term home is synonymous with the term subscriber. The digital CATV network drastically improves signal quality as transmission of digital signals do not require a highly linear network. Digital signals can tolerate higher noise levels than analog signals. The quality of digital signals can be sufficiently maintained in transmission through thousands of kilometers of fiber optic cable by spacing repeaters or optical amplifiers in the transmission path (e.g., every 100 kilometers) to relay the digital signals.

In one embodiment, a digital transmitter at a headend digitizes each analog video channel and frames the digital data into a Synchronous Optical NETwork (SONET) Optical Carrier level 3c (OC-3c) bitstream. The electrical equivalent of OC-N is Synchronous Transport Signal level N (STS-N). In this application, the terms OC and STS are used interchangeably. OC-3c is sufficient to transmit a 6 MHz analog video channel with a reasonable signal-to-noise ratio. The digital headend transmitter also provides error-encoding to each digital video channel and frames the error-encoded digital video channels in groups of three into a SONET OC-3 bitstream. High quality digital video can be transmitted at an OC-1 bit-rate. N digital video channels can be framed into an OC-N bit-rate. SONET bitstreams from M analog video channels and groups of digital video channels are time-division multiplexed and sent at M times the OC-3 bit-rate through fiber optic cables from the headend to the nodes. In a MFPC system, the data is first broadcast from the headend to the mux fiber nodes which further broadcast the data to the mini fiber nodes. The mux-fiber nodes do not change the format of the data.

The SONET bitstreams are demultiplexed at the nodes back to the OC-3 bit-rate and deframed to recover the digital data. Digital data corresponding to analog video channels is converted back to an analog format. Digital data corresponding to digital video channels is digitally modulated and converted to an analog format. Channels in their analog format are frequency-division multiplexed by modulation onto designated radio frequency carriers and distributed through coaxial cables to homes.

Information for interactive services, such as telephony or the Internet, originates from many locations and is not consistently transmitted over time. Telephone calls are typically short in duration, averaging about 3 minutes. Internet traffic duration averages over 30 minutes. Therefore, the ability to add or drop channels easily is advantageous. The digital CATV network time-division multiplexes channels for transmission from the headend to the nodes. Time Division Multiplexing (TDM) allows for multiple locations from the headend to the nodes where channels can be easily added or dropped as the need arises. Telephony and Internet services are already built on the characteristics and performance of TDM technology.

Interactive services make the CATV network increasingly more symmetric, with as much information traveling upstream as downstream. Downstream refers to data that flows from the CATV network to the homes, and upstream refers to data that flows from the homes to the CATV network. In one embodiment, bandwidth for upstream data is allocated between 5 MHz and 45 MHz as well as between 900 MHz and 1 GHz. Each headend serves 10,000 to 300,000 or more homes. Each node serves a subset of the homes served by the headend. It is advantageous to be able to add or drop data at each node so that fewer homes share the allocated bandwidth for upstream data.

A location where data can be added or dropped is referred to as a "Point of Presence" (POP). A POP links external data networks, including the Internet, cellular network, Public Switched Telephone Network (PSTN), and satellite network, to the digital CATV network. Information from the external data networks passes to the digital CATV network at the POP. Additionally, information from the digital CATV network can pass to the external data networks at the POP. For example, the headend or the node can serve as a POP. A bank of modems can be incorporated in each POP to interface between the external data networks and the homes. The bank of modems can also pass information between the homes serviced by the digital CATV network. Other locations in the digital CATV network, such as the mux fiber node in the MFPC system, can also serve as a POP. Multiple POPs between the headend and the nodes provide the flexibility to add or drop data that is common to multiple nodes.

A closed-loop digital CATV network increases the reliability of the network due to feedback. Digital format includes extra bits, such as parity bits, to detect defects, errors, or failures in transmission. Remote indications control action in network protocols and bad packets can be resent without interruption.

A digital CATV network is cost-efficient. Costly processing, such as Forward Error Correction (FEC) of digital video channels, is performed at a headend. Standardized, thus economical, digital network equipment is used throughout the network by framing digital data into standardized bit-rates, such as OC-3, OC-12, OC-48, or OC-192. The ability to add or drop channels at nodes increases the effective upstream bandwidth without installing more fiber optic cables from the headend to the nodes.

In the figures, the first digit of any three-digit number generally indicates the number of the figure in which the element first appears. Where four-digit reference numbers are used, the first two digits generally indicate the figure number.

DETAILED DESCRIPTION

The present invention involves the conversion of analog video channels, digital video channels and digital data into a digital format for transmission via fiber optic cables to nodes in a digital CATV network. The analog video channels, digital video channels and digital data in the digital format are converted to an analog broadband signal at the nodes for broadcast via coaxial cables to homes.

Figure 1A:
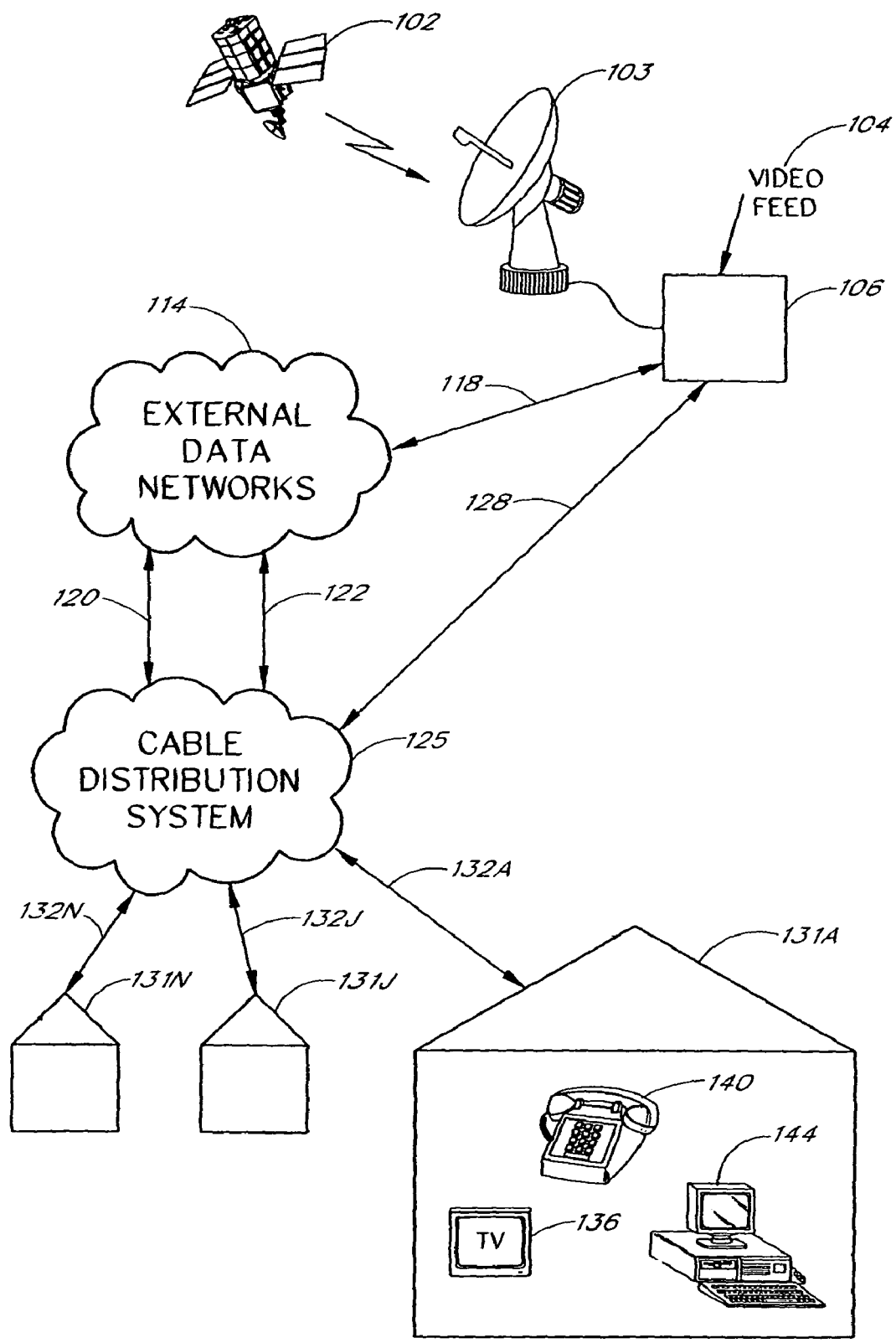
FIG. 1A is an illustration of a CATV network.

A digital CATV network system is illustrated in FIG. 1A. Information from various sources, such as signals received by a satellite dish 103 from a satellite 102 and signals from a video feed 104, are received at a headend 106. The headend 106 prepares the received information for transmission to homes 131 (shown as 131A, 131J and 131N) through a cable distribution system 125. Fiber optic cables 128 are typically used in transmission paths between the headend 106 and the cable distribution system 125. Coaxial cables 132 (shown as 132A, 132J and 132N) are typically used in transmission paths between the cable distribution system 125 and respective homes 131. POPs 118, 120, 122 connect external data networks 114 to the headend 106 and various locations in the cable distribution system 125. The external data networks 114 can include, for example, the Internet, a PSTN, a cellular network and a satellite network. The digital CATV network system is capable of providing services simultaneously to, for example, a television 136, a telephone 140, and a computer 144 inside the home 131A.

Figure 1B:
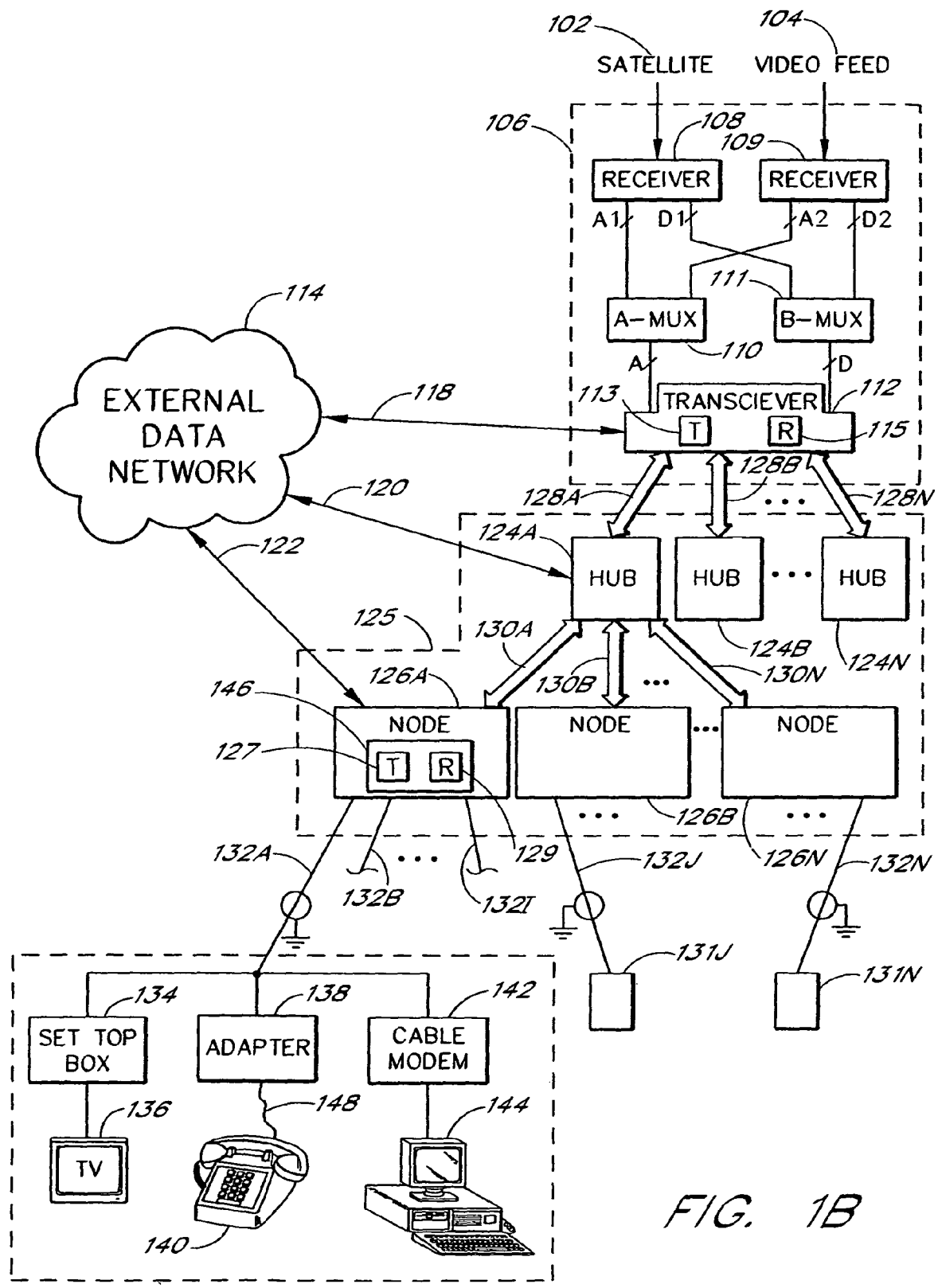
FIG. 1B is a detailed diagram of the CATV network illustrated in FIG. 1A.

FIG. 1B is a detailed block diagram of the CATV network system illustrated in FIG. 1A. In the headend 106, signals from the satellite 102 and the video feed 104 are received by receivers 108, 109. Analog signals from each receiver 108, 109 are provided to an analog multiplexer 110. Digital signals from each receiver 108, 109 are provided to a digital multiplexer 111. The multiplexed analog and digital signals are provided to a digital headend transceiver 112. The digital headend transceiver 112 includes a digital headend transmitter 113 and a digital headend receiver 115. Information at the headend 106 is transmitted from the digital headend transmitter 113 to the cable distribution system 125 via N fiber optic cables shown as fiber optic cables 128A-128N (collectively the fiber optic cables 128). Information is received from the cable distribution system 125 by the digital headend receiver 115 via the fiber optic cables 128.

In one embodiment, the cable distribution system 125 includes N hubs shown as hubs 124A-124N (collectively the hubs 124). The hubs 124 communicate with the headend 106 via the fiber optic cables 128. Each hub 124 communicates with N nodes shown as nodes 126A-126N (collectively the nodes 126) via N fiber optic cables shown as fiber optic cables 130A-130N (collectively the fiber optic cables 130). The nodes 126 communicate with N homes shown as homes 131A-131N (collectively the homes 131) via N coaxial cables shown as coaxial cables 132A-132N (collectively the coaxial cables 132). Each node 126 is connected to multiple homes 131. Each home 131 is connected to one node 126. For example, the home 131A is connected to the node 126A via the coaxial cable 132A, the home 131J is connected to the node 126B via the coaxial cable 132J, and the home 131N is connected to the node 126N via the coaxial cable 132N.

A digital node transceiver 146 process signals in each node 126. The digital node transceiver 146 includes a digital node transmitter 127 and a digital node receiver 129. The digital node transmitter 127 transmits information to the homes 131 while the digital node receiver 129 receives information from the homes 131. Information from the external data networks 114 can also be added at the various POPs 118, 120, 122 for transmission in the cable distribution system 125.

In another embodiment, one or more of the hubs 124 are not directly connected to the headend 106 via the fiber optic cables 128. Instead, one or more of the hubs 124 are daisy-chained to another hub 124 which has a direct connection to the headend 106. Alternatively, the hubs 124 can be connected in a ring configuration with a subset of the hubs 124 directly connected to the headend 106. Similarly, the nodes 126 can be connected in a ring configuration or daisy-chained with a subset of the nodes 126 directly connected to the hubs 124.

In an alternate embodiment, the cable distribution system 125 does not include the hubs 124. The headend 106 communicates with the nodes 126 via the fiber optic cables 130. Each node 126 in the embodiment without the hubs 124 typically services more homes 131 than each node 126 in the embodiment with the hubs 124. For convenience, subsequent discussions in this application assume the cable distribution system 125 includes the hubs 124.

Inside the homes 131, various interfaces interpret the broadband signal for processing by the intended equipment. For example, a set top box 134 receives the video channels for display on the television set 136, an adapter 138 receives telephony data and adapts the signal from the coaxial cable 132A to a twisted-pair telephone line 148, and a cable modem 142 receives computer network data for the computer 144. A variety of services, including interactive services, can share the same cables and equipment in this digital CATV network.

Information received at the headend 106 for transmission in the cable distribution system 125 can be in either analog or digital format. For example, analog video channels are typically received in 6 MHz wide analog bands modulated onto an IF carrier, and digital video channels are typically received as 8-bit MPEG data. The digital headend transmitter 113 in the headend 106 converts the analog and digital video channels to a digital format and combines the channels, using TDM technology, for transmission to the hubs 124 via the fiber optic cables 128. The fiber optic cables 128 can be up to thousands of kilometers in length. The hubs 124 further transmit the video channels encoded in the digital format to the nodes 126 via the fiber optic cables 130.

The digital node transmitter 127 in each node 126 converts the video channels encoded in the digital format back to their respective analog and digital format. The digital node transmitter 127 further modulates the video channels onto designated radio frequency carriers and frequency-division multiplexes the channels into a broadband signal for transmission to the homes 131 via the coaxial cables 132. In this application, the locations where information goes through final processing before being transmitted to the homes 131 are call the nodes 126. In the CATV art, the connections between the nodes 126 and the homes 131 are called the "last mile." Typically, the last mile uses coaxial cables 132 and multiple homes 131 can be coupled to one coaxial cable 132. However, the present invention can be utilized in systems that use fiber optic cables, coaxial cables or a combination of both for all transmissions.

Since video channels are transmitted from the headend 106 to the nodes 126 in the digital format using TDM technology, channels can be easily added or dropped between the headend 106 and the nodes 126. The headend 106 serves many homes 131 (e.g., 50,000 to 300,000) and each hub 124 serves a subset of those homes 131 (e.g., 5,000 or less to 50,000 or more). The flexibility to add or drop channels at the hubs 124 allow television programming to be customized for smaller regions. Furthermore, the ability to add or drop channels at the nodes 126 makes narrowcasting possible. Narrowcasting customizes television programming for small groups. The nodes 126 serve fewer homes 131 than the headend 106. Through narrowcasting, television programming can be tailored for each neighborhood.

Figure 10:
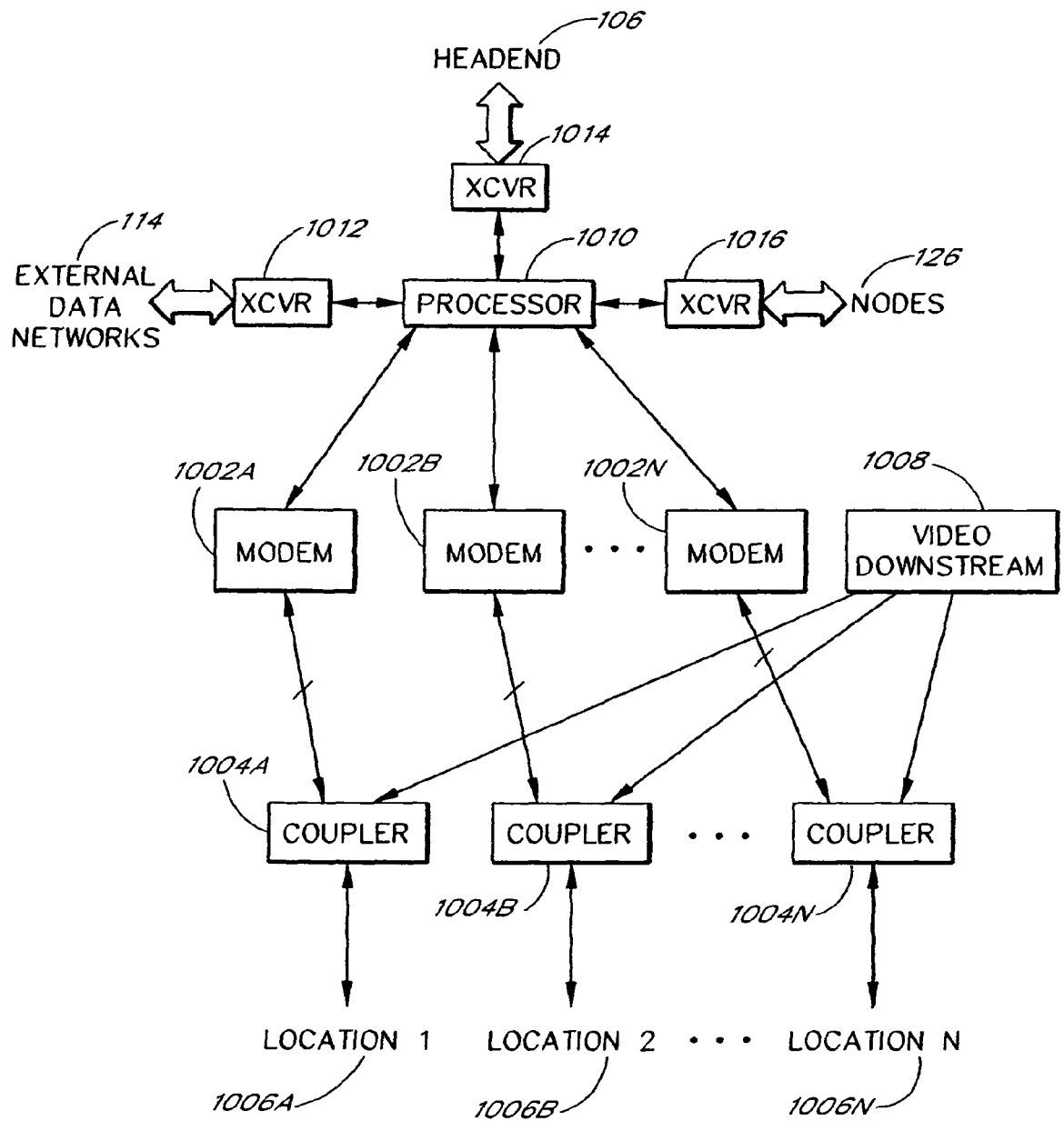
FIG. 10 illustrates a method to distribute Internet protocal data in the digital CATV network.
Figure 11:
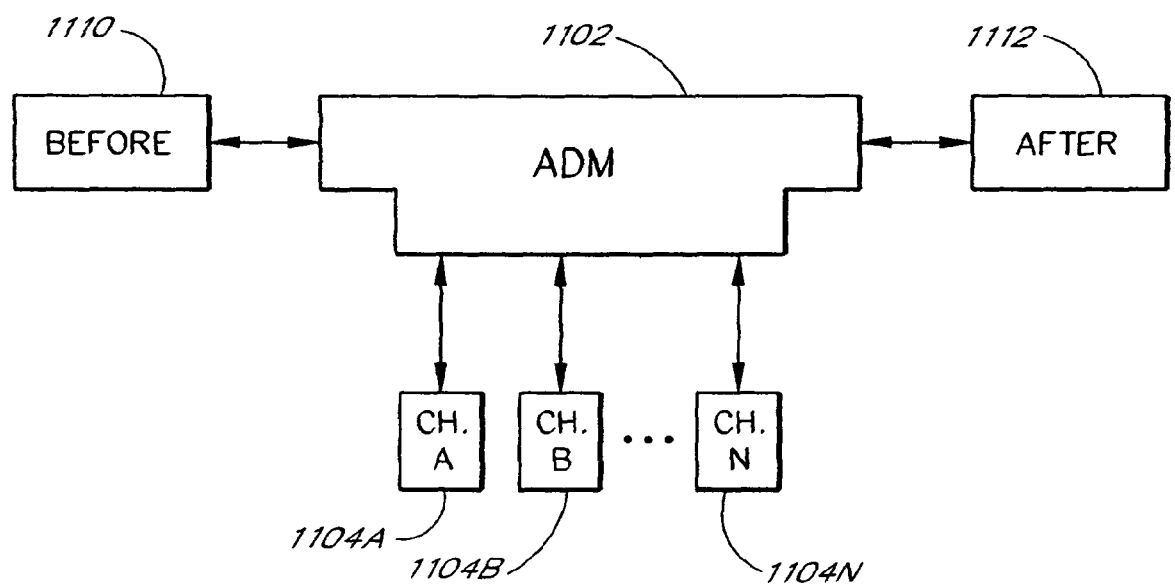
FIG. 11 illustrates a method to add or drop information in a digital format.

Information in a digital format from other sources can be easily added to a video downstream. In one embodiment, information from the external data networks 114 can be added or dropped at the various POPs 118, 120, 122 in the digital CATV network. The various POPs 118, 120, 122 include the headend 106, the hubs 124, and the nodes 126. FIGS. 10 and 11, discussed later in this application, illustrate methods to combine information from various sources.

Figure 2:
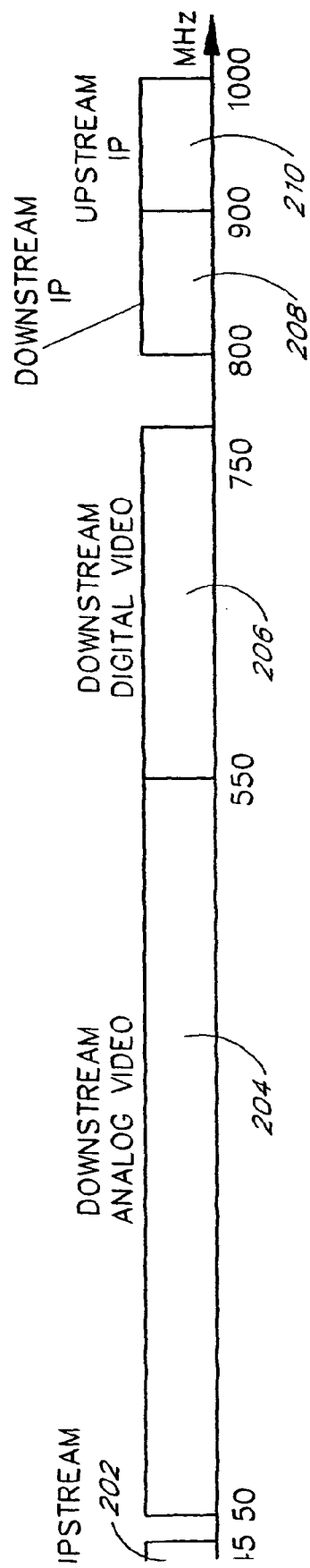
FIG. 2 is a graph showing spectral locations that different services occupy in a broadband signal delivered by a CATV network to subscribers' homes.

FIG. 2 is a graph showing spectral locations that different services can occupy in a broadband signal delivered by the CATV network to the homes 131. In one embodiment, upstream data occupies a first frequency band 202 (e.g., between 5 MHz and 45 MHz). Downstream analog video channels occupy a second frequency band 204 (e.g., between 50 MHz and 550 MHz). Downstream digital video channels occupy a third frequency band 206 (e.g., between 550 MHz and 750 MHz). Downstream Internet Protocol (IP) data occupies a fourth frequency band 208 (e.g., between 800 MHz and 900 MHz). Upstream IP data occupies a fifth frequency band 210 (e.g., between 900 MHz and 1 GHz).

Upstream information flows from the homes 131 to the cable distribution system 125. Downstream information flows from the cable distribution system 125 to the homes 131. Downstream analog video channels and downstream digital video channels occupy the second frequency band 204 and the third frequency band 206. In one embodiment, the second frequency band 204 and the third frequency band 206 take up 70% of a 1 GHz broadband signal. Interactive services, including telephony and high-speed data access, occupy the first frequency band 202, the fourth frequency band 208, and the fifth frequency band 210. Interactive services take up less than 30% of the 1 GHz broadband signal.

As demand grows for interactive services, a CATV network quickly runs out of bandwidth if too many homes 131 share the same frequency bands in a broadband signal. Therefore, it is advantageous to establish a digital CATV network where the 1 GHz broadband signal is assembled at the nodes 126 which serve a relatively small group of homes 131. The home 131A tied to the first node 126A does not have to share the available bandwidth with the home 131J tied to the second node 126B. For example, interactive services are simultaneously delivered to the first home 131A tied to the first node 126A and the second home 131J tied to the second node 126B. By the nature of interactive services, the data packets going to and from the first home 131A are distinct from the data packets going to and from the second home 131J. The data packets flow through the cable distribution system 125 using TDM technology. The data packets are modulated onto designated frequency carriers at the nodes 126 and become part of the broadband signal that is transmitted from the nodes 126 to the homes 131. The data packet destined for the first home 131A occupies a frequency carrier in a first broadband signal being broadcast from the first node 126A. The data packet destined for the second home 131J can occupy the same frequency carrier in a second broadband signal being broadcast from the second node 126B. The first broadband signal is not received by the home 131J tied to the second node 126B, and the second broadband signal is not received by the home 131A tied to the first node 126A. To conserve bandwidth, the data packet destined for the second home 131J does not unnecessarily occupy any bandwidth in the first broadband signal, and the data packet destined for the first home 131A does not unnecessarily occupy any bandwidth in the second broadband signal.

Figure 3A:
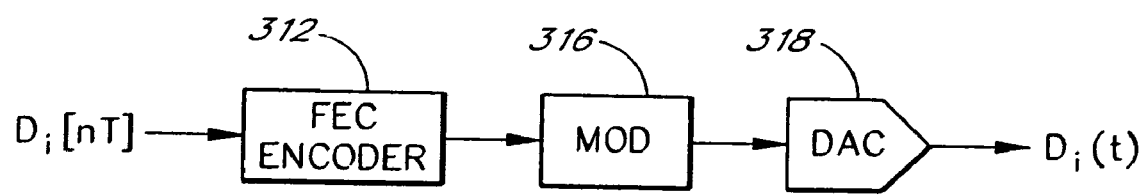
FIG. 3 (shown as 3A and 3B) is a block diagram of an analog headend transmitter, including frequency domain representation of waveforms at various points.
Figure 3B:
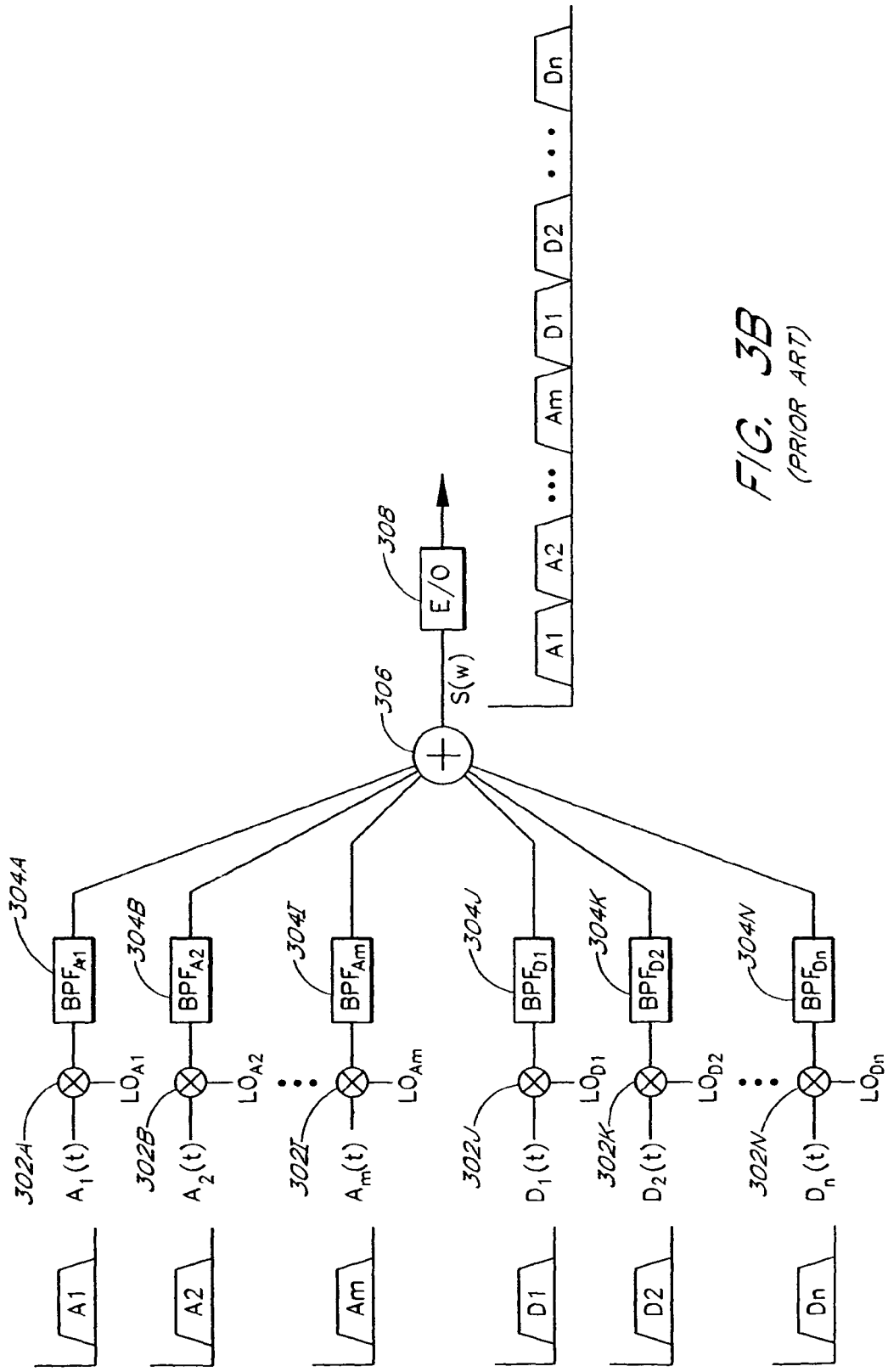

FIG. 3 (shown as 3A and 3B) is a block diagram of one embodiment of an analog headend transmitter 320. Analog video channels $A_i(t)$ and partially-processed digital video channels $D_i(t)$ are processed by N respective upconverters shown as upconverters 302A-302N (collectively the upconverters 302), followed by N respective Band Pass Filters (BPFs) shown as BFPs 304A-304N (collectively the BFPs 304). Each digital video channel $D_i[nT]$ is processed by a FEC encoder 312, a digital modulator 316, and a Digital-to-Analog-Converter (DAC) 318 prior to processing by the respective upconverter 302 and the respective BPF 304. Multiple analog video channels and digital video channels are frequency-division multiplexed in a combiner 306 after the above signal processing. The frequency-division multiplexed electrical signal $S(\omega)$ passes through an electrical-to-optical converter 308 for transmission via the fiber optic cables 128.

In the analog headend transmitter 320, analog video channels $A_i(t)$ are received at the headend 106 as IF signals. The analog video channels are modulated onto respective designated radio frequency carriers after passing through the respective upconverters 302 and the respective BPFs 304. Digital video channels $D_i[nT]$ are received at the headend 106 in digital bits. Each digital video channel goes through extra processing. The digital bits pass through the FEC encoder 312 to reduce the probability of errors in the transmission. The digital bits are then provided to the digital modulator 316 and the DAG 318. The output $D_i(t)$ of the DAC 318 is an analog equivalent of the digital video channel. The DAC outputs are modulated onto respective designated radio frequency carriers after passing through the respective upconverters 302 and the respective BPFs 304. The analog and digital video channels are frequency-division multiplexed in the combiner 306 into a broadband signal $S(\omega)$. The broadband signal $S(\omega)$ is converted to an optical signal by the electrical-to-optical converter 308. The optical signal is transmitted from the headend 106 via the fiber optic cables 128. Frequency Division Multiplexing (FDM) does not always facilitate easy adding or dropping of channels. The adding or dropping process can be costly. Thus, in one embodiment, channels are only added or dropped at the headend 106.

Figure 4:
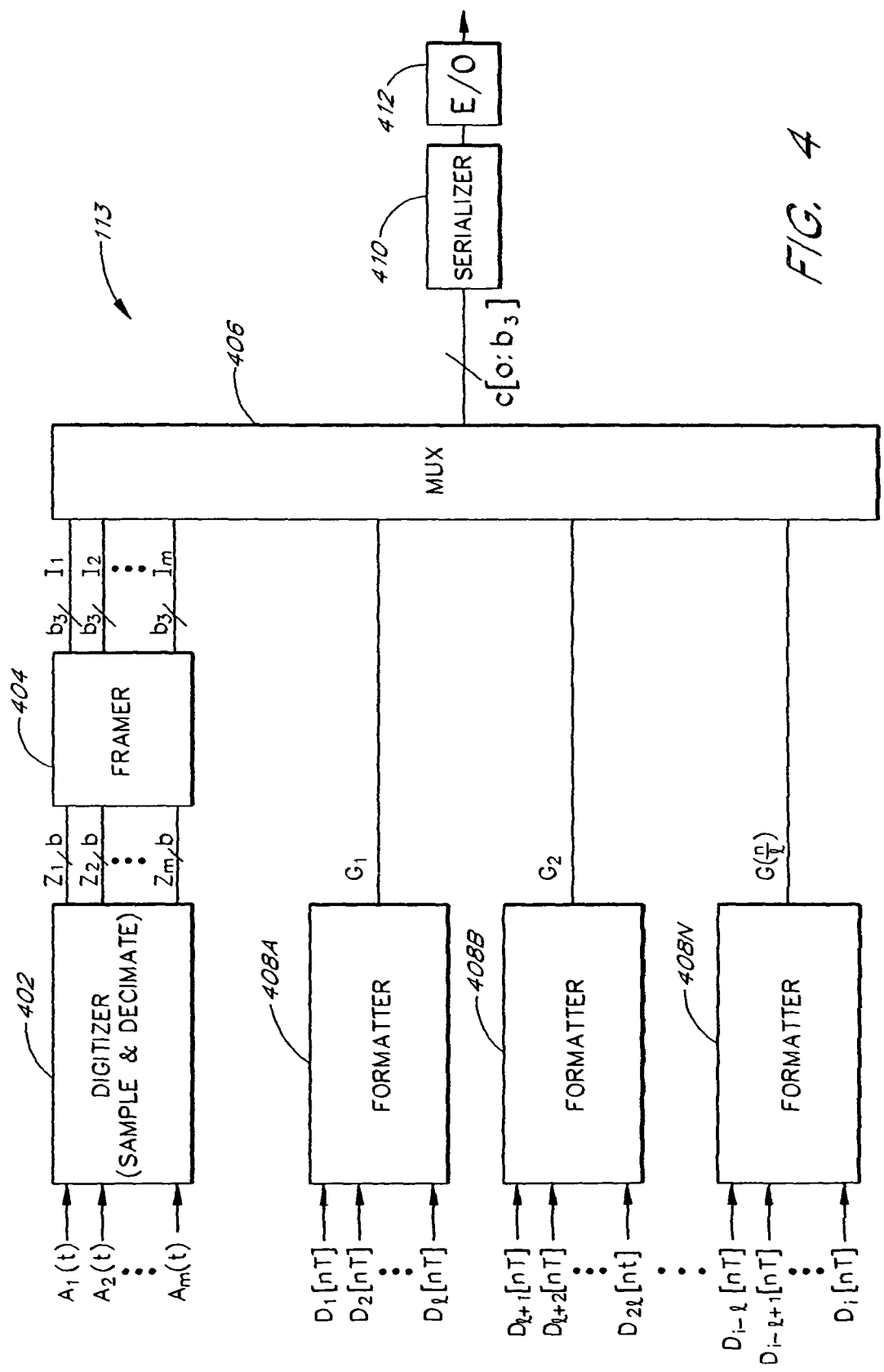
FIG. 4 is a block diagram of a digital headend transmitter.

The present invention uses the digital headend transmitter 113 shown in FIG. 1B. A block diagram of one embodiment of the digital headend transmitter 113 is shown in FIG. 4. Analog video channels $A_i(t)$ are provided to a digitizer 402. The digital bits $Z_i[0:b1]$ at the output of the digitizer 402 are provided to a framer 404. N groups of digital video channels $D_i[nT]$ are provided to N respective formatters shown as formatters 408A-408N (collectively the formatters 408). The digital outputs $I_i[0:b3]$ of the framer 404 and the digital outputs $G_i[0:b3]$ of the formatters 408 are combined in a multiplexer 406. The combined digital signal $C[0:b3]$ is converted from a parallel representation to a serial representation in a serializer 410. The serial digital signal at the output of the serializer 410 passes through an electrical-to-optical converter 412 in preparation for transmission via the fiber optic cables 128.

Analog video channels $A_i(t)$ are individually sampled and decimated in the digitizer 402. The digital bits $Z_i[0:b1]$ of each analog video channel are arranged in a digital format in the framer 404. In one embodiment, SONET is used as the digital format. SONET is a standard for optical telecommunications transport. The standard allows equipment from different suppliers to be used in a fiber system. However, other standards (e.g., Asynchronous Transfer Mode or Fiber Channel (FC)) can be used in conjunction with SONET. SONET format advantageously requires a relatively small amount of additional bits to be added to raw data. SONET overhead is approximately 3% of the raw data. In another embodiment, SONET data can be segmented and incorporated into system using FC protocol by adding FC frames around SONET data.

In one embodiment, the bandwidth of each analog video channel $A_i(t)$ is 6 MHz wide, and the bit-rate of the corresponding digital representation $Z_i[0:b1]$ at the output of the digitizer 402 is 129.6 Mega-Bits-Per-Second (Mbps). Each digitized analog video channel cannot fit directly into a single 52 Mbps OC-1 payload. Therefore, the digital bits $Z_i[0:b1]$ are framed into an OC-3c payload which is a 155.52 Mbps bitstream. The "c" appended to "OC-3" signifies that envelope capacities from three OC-1s have been concatenated to transport one signal.

In one embodiment, the digital video channels $D_i[nT]$ are introduced to the digital headend transmitter 113 in the form of digital bits, such as 8-bit MPEG data. Groups of digital video channels are provided to the respective formatters 408. The formatters 408 provide error-encoding (e.g., FEC) for each individual digital video channel. Then the formatters 408 frame respective groups of digital video channels into a digital format. Each digital video channel can be framed individually into an OC-1 bit-rate or N digital video channels can be framed together into an OC-N bit-rate. The formatters 408 can process digital data from the external data networks 114 in a similarly manner as digital video channels. Digital data is also error-encoded and framed before it is added to other data in the downstream flow.

The digital CATV network can be more economical using a higher bit-rate. At the same time, it is advantageous to frame at a low bit-rate to provide relatively more flexibility in the dropping and adding of channels. For example, increased flexibility to drop or add channels facilitates narrowcasting. In one embodiment, three digital video channels are framed together into an OC-3 bit-rate. Network equipment for processing OC-3 bit-rate signals is widely available and inexpensive due to economy of scale. Standard network equipment is also available to process bit-rates of OC-12, OC-48, and OC-192.

Information is represented by eight-bit wide digital bytes in a SONET format. In one embodiment, the digital outputs $I_i[0:7]$ of the framer 404 and the digital outputs $G_i[0:7]$ of the formatters 408 are in the SONET format using an OC-3 bit-rate. The digital outputs $I_i[0:7]$ and $G_i[0:7]$ are combined using TDM technology in the multiplexer 406. The combined digital signal $C[0:7]$ is converted from an 8-bit parallel representation to a serial representation in the serializer 410.

Figure 5A:
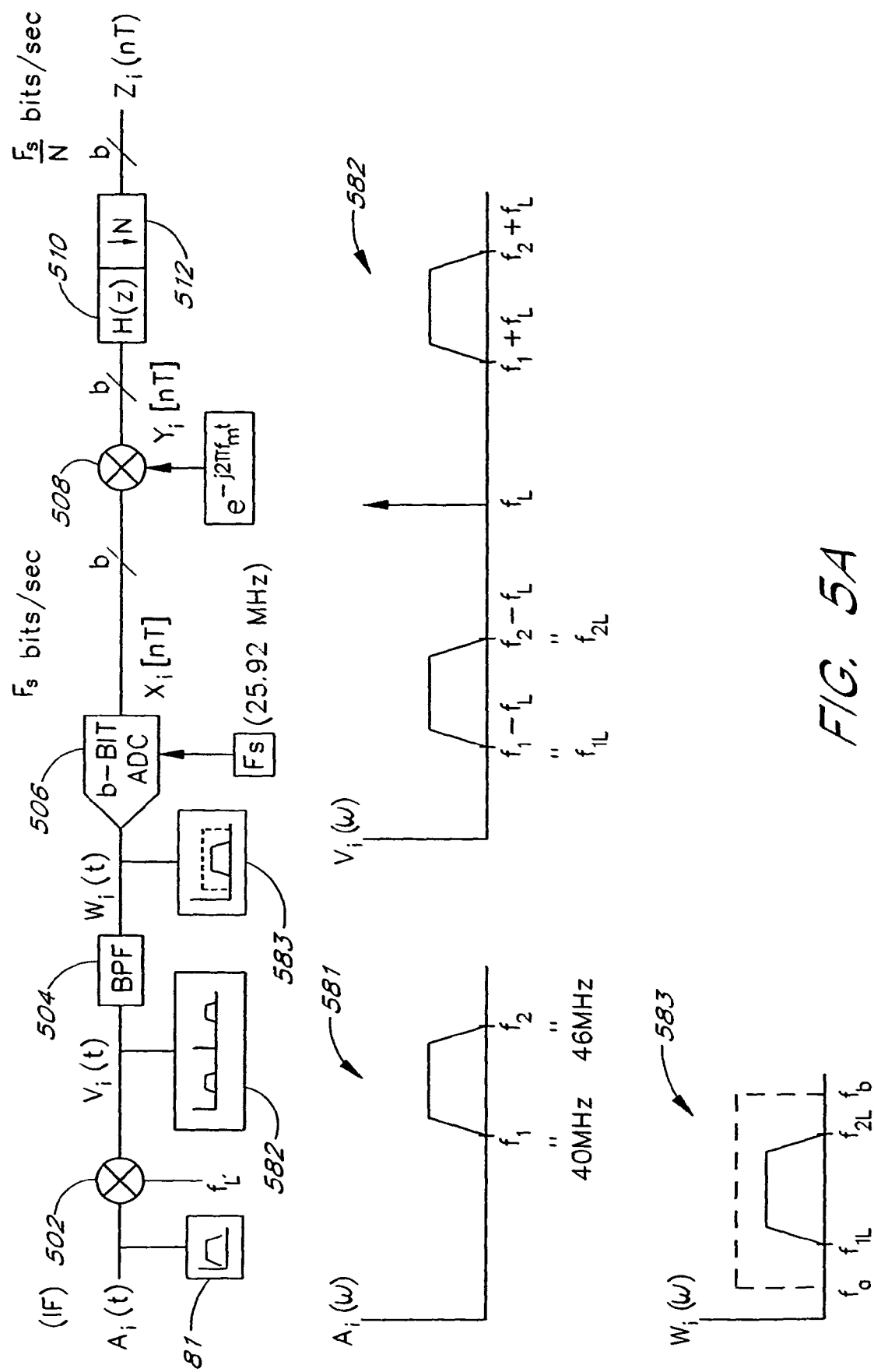
FIG. 5A is a block diagram of one embodiment of a digitizer in the digital headend transmitter shown in FIG. 4, including frequency domain representation of waveforms at various points.

FIG. 5A is a block diagram of one embodiment of the digitizer 402 used to digitize and decimate each analog video channel $A_i(t)$ in the digital headend transmitter 113. Each analog video channel $A_i(t)$ is provided to a downconverter 502 followed by a BPF 504. The output $W_i(t)$ of the BPF 504 is provided to an Analog-to-Digital Converter (ADC) 506. The digital output $X_i[nT]$ of the ADC 506 is provided to a digital mixer 508. The output $Y_i[nT]$ of the digital mixer 508 is provided to an anti-aliasing digital filter 510 followed by a sample rate compressor 512. The output $Z_i[nT]$ of the sample rate compressor 512 is a digitized version of the analog video channel $A_i(t)$.

In one embodiment, an analog video channel $A_i(t)$ is a 6 MHz wide IF signal. A spectral plot $A_i(\omega)$ 581 shows the analog video channel occupying a bandwidth between 40 MHz and 46 MHz. $A_i(t)$ is frequency shifted to a second IF by the downconverter 502. The output $V_i(t)$ of the downconverter 502 is provided to the BPF 504 to remove unwanted spectral images. It is more advantageous to downconvert $A_i(t)$ to the second IF rather than to a baseband frequency. Unwanted spectral images are spectrally further from the desired signal in downconversion to the second IF. Thus, performance requirements for the subsequent BPF 504 are less stringent.

In one embodiment, a ten-bit ADC 506 is used to digitize the second IF signal $W_i(t)$ at the output of the BPF 504. Ten bits typically provide an acceptable signal-to-noise ratio (SNR) in the cable distribution system 125. Fewer bits cause noticeable degradation to the overall performance of the digital CATV network. More bits decrease the throughput with no significant improvement in performance.

For Nyquist sampling, the sampling frequency Fs is at least twice the highest frequency of a signal. In one embodiment, the second IF signal $W_i(t)$ at the output of the BPF 504 is between 6 MHz and 12 MHz. The sampling frequency Fs of the ADC 506 is 25.92 MHz, which is greater than twice the highest frequency of the second IF signal $W_i(t)$. The digital output $X_i[nT]$ of the ADC 506 is provided to the digital mixer 508 to frequency shift the sampled signal to a baseband frequency.

Spectral images of a signal repeat at f±nFs after sampling, where f is the frequency of the signal being sampled, and n is a positive integer. The digital baseband signal $Y_i[nT]$ at the output of the digital mixer 508 is provided to the anti-aliasing digital filter 510 followed by the sample rate compressor 512. The anti-aliasing digital filter 510 is configured to suppress frequencies that can otherwise overlap after processing by the sample rate compressor 512. The sample rate compressor 512 causes the repeating spectral images of the sampled signal to be spectrally closer together. The degree of closeness is determined by a decimation factor. The decimation factor is a positive integer. The sample rate compressor 512 increases data throughput, thus allowing more channels to be simultaneously broadcast, in the cable distribution system 125 by transmitting a subset of the sampled signal. The signal $Z_i[nT]$ at the output of the sample rate compressor 512 has an effective sampling frequency that is lower than the sampling frequency Fs of the ADC by a factor equivalent to the decimation factor. Signals are typically over-sampled. Signal integrity is maintained in the cable distribution system 125 so long as the effective sampling frequency at the output of the sample rate compressor 512 satisfies the Nyquist criterion.

In one embodiment, a 6 MHz analog video channel is sampled by a ten-bit DAC 506 using a sampling frequency Fs of 25.92 MHz. A decimation factor of two is used by the sample rate compressor 512 to reduce the number of samples by half. Every other sample is provided to the cable distribution system 125. The effective sampling frequency of the transmitted signal is 12.96 MHz, half of Fs. The effective sampling frequency, 12.96 MHz, is more than twice the analog video channel bandwidth, 6 MHz. Thus, the Nyquist rate is satisfied, and the signal can be accurately transmitted using half of the samples. Using the sampling frequency of 25.92 MHz, the ten-bit DAC 506, and the decimation factor of two, the bit throughput for each analog video channel is 129.6 Mbps from the output of the digitizer 402 (25.92 MHz x 10 bits/2).

Figure 5B:
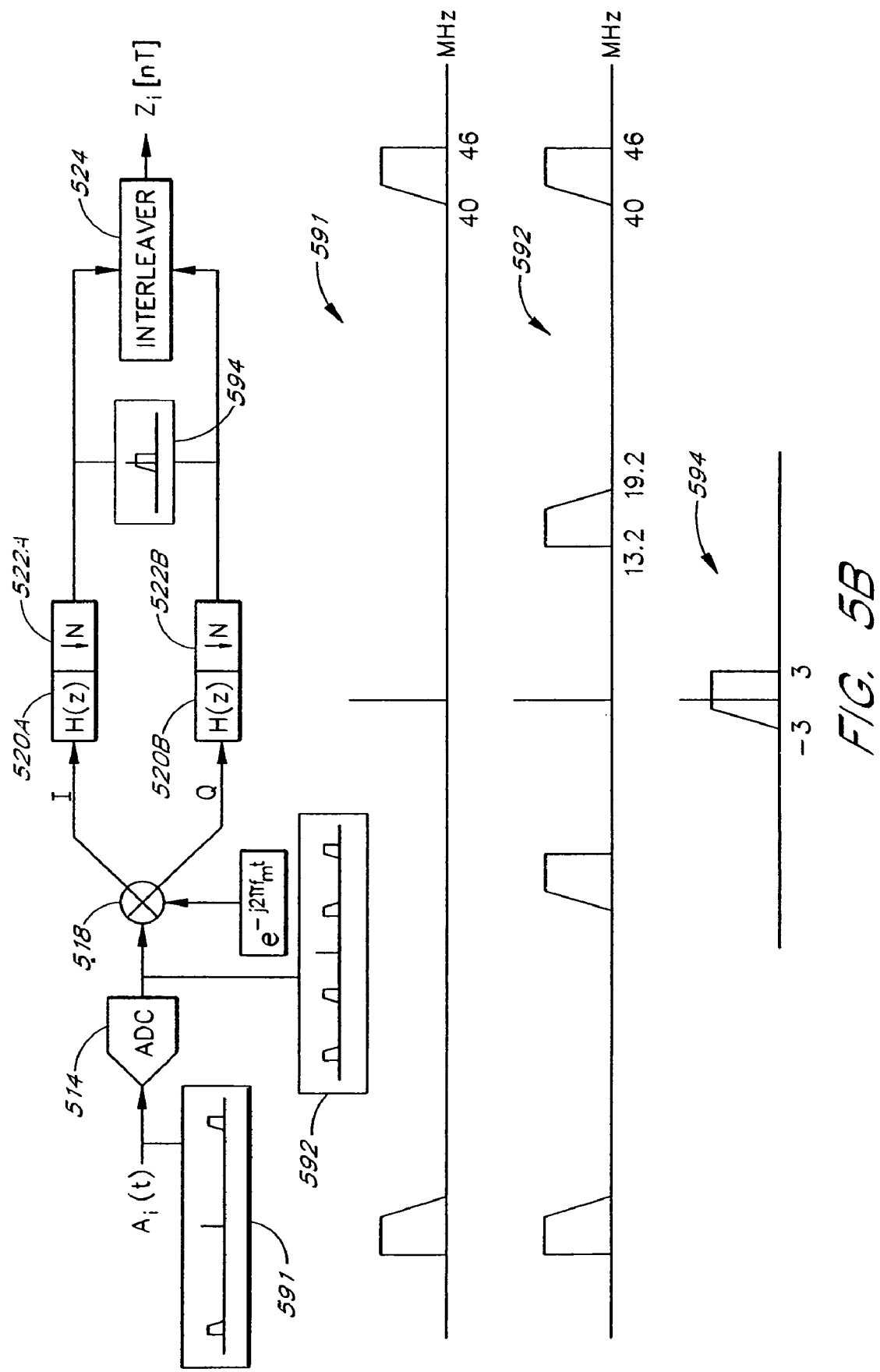
FIG. 5B is a block diagram of an alternate embodiment of a digitizer in the digital headend transmitter shown in FIG. 4, including frequency domain representation of waveforms at various points.

FIG. 5B is a block diagram of an alternate embodiment of the digitizer 402 used to digitize and decimate each analog video channel $A_i(t)$ in the digital headend transmitter 113. Each analog video channel $A_i(t)$ is provided directly to an ADC 514. The output of the ADC 514 is provided to a half-complex mixer 518. The half-complex mixer 518 produces two outputs which are provided to respective anti-aliasing digital filters 520A, 520B followed by respective sample rate compressors 522A, 522B. The outputs from the respective sample rate compressors 522A, 522B are provided to an interleaver 524.

In one embodiment, the analog video channel $A_i(t)$ is an IF signal lying in a 6 MHz band of 40 to 46 MHz as illustrated by a spectral plot 591. A ten-bit ADC 514 undersamples the IF signal such that no aliasing occurs. A spectral plot 592 illustrates undersampling at 59.2 MHz. The half-complex mixer 518 frequency shifts the IF signal to a baseband frequency and outputs a complex signal with an in-phase (I) component and a quadrature-phase (Q) component. A spectral plot 594 illustrates the complex baseband signal. The anti-aliasing digital filter 520A and the sample rate compressor 522A filter and decimate the I component. The Q component is similarly filtered and decimated by the anti-aliasing digital filter 520B and the sample rate compressor 522B. Finally, the interleaver 524 interleaves the decimated I and Q components in preparation for framing into a digital format.

Figure 6:
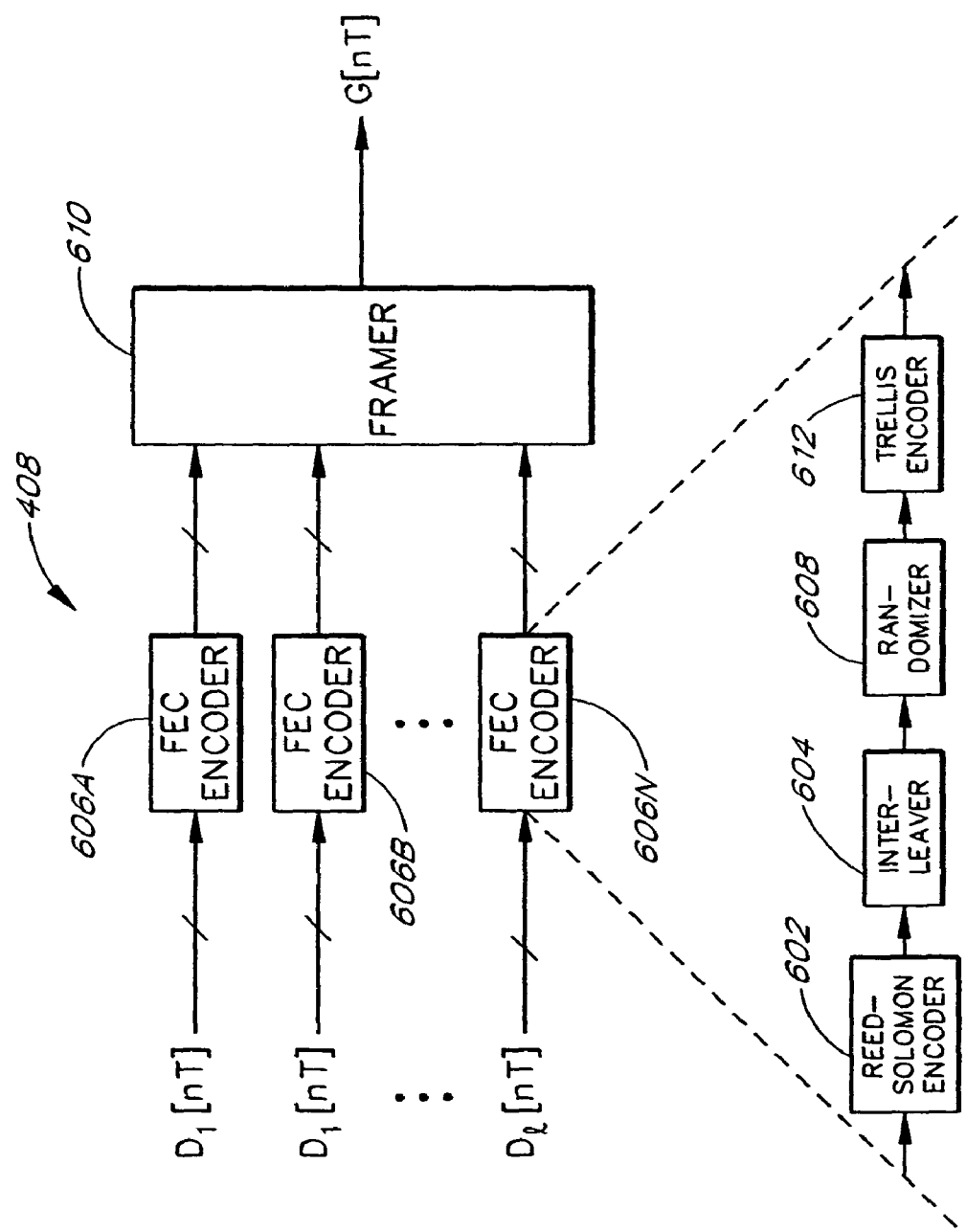
FIG. 6 is a block diagram of a formatter in the digital headend transmitter shown in FIG. 4.

FIG. 6 is a block diagram of one of the formatters 408 used to error-encode and frame a group of digital video channels in one embodiment of the digital headend transmitter 113. The group of N digital video channels are provided to N respective FEC encoders shown as FEC encoders 606A-606N (collectively the FEC encoders 606). In one embodiment, each FEC encoder 606 includes a Reed-Solomon encoder 602, an interleaver 604, a randomizer 608, and a trellis encoder 612. The group of individually error-encoded digital video channels is combined in a framer 610. Digital data from the external data networks 114 can be processed by the formatters 408 in a similar manner. In addition to the headend 106, the formatters 408 can reside in other POPs 120, 122 to receive and prepare digital data for addition to the downstream transport.

In one embodiment, the digital video channels $D_i[nT]$ are presented in the form of eight-bit MPEG datastreams. The digital bits are provided to the FEC encoders 606. A simple FEC scheme is to send redundant signal bits. This simple FEC scheme is effective but relatively less efficient. More complex coding has been developed to provide FEC with a minimal set of extra bits. In one embodiment, the Reed-Solomon encoder 602 is used for the FEC. The Reed-Solomon encoder 602 provides block encoding and corrects multiple symbols within a block. The interleaver 604 evenly disperses the symbols and enables the correction of burst noise induced errors. The randomizer 608 provides for even distribution of the symbols in a constellation. The trellis encoder 612 allows the introduction of redundancy to improve the threshold SNR by increasing the symbol constellation without increasing the symbol rate. Individually encoded digital video channels are combined with other similarly encoded digital video channels in the framer 610. The combined signal is in a digital format. In one embodiment, the digital format is a SONET format with an OC-N bit-rate, where N denotes the number of individual digital video channels in the combined signal.

The FEC encoders 606 largely address transmission errors from the nodes 126 to the homes 131, where analog and digital video channels are frequency-division multiplexed into a broadband signal and sent through the coaxial cables 132. The set top box 134 and the cable modem 142 inside the homes 131 perform the FEC decoding. Digital transmission from the headend 106 to the nodes 126 benefits from a network protocol that automatically monitors errors. Therefore, the error-encoding process of the digital video channels can take place at the nodes 126 without jeopardizing its functionality. However, encoding at multiple nodes 126 instead of at the single headend 106 incurs relatively more cost without significant benefit.

Figure 7:
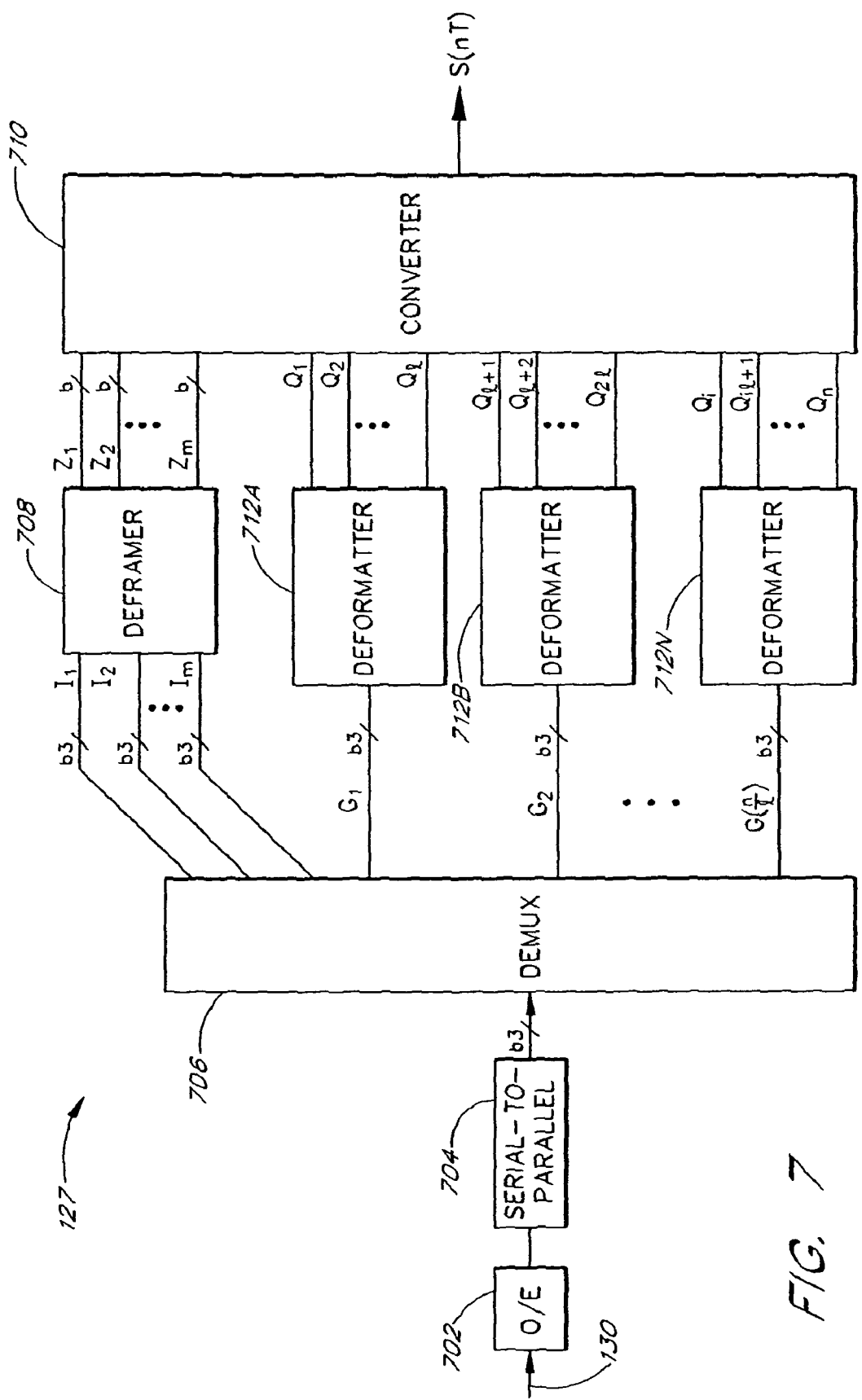
FIG. 7 is a block diagram of a digital node transmitter.

FIG. 7 is a block diagram of one embodiment of the digital node transmitter 127. Optical digital data is received from the fiber optic cables 130 and transformed to electrical digital data by an optical-to-electrical converter 702. The electrical digital data is typically provided to a serial-to-parallel converter 704 to allow processing as bytes. The output of the serial-to-parallel converter 704 is provided to a demultiplexer 706 to separate digital data that has been previously combined by the multiplexer 406. The digital outputs of the demultiplexer 706 corresponding to analog video channels are provided to a deframer 708. The digital outputs of the demultiplexer 706 corresponding to N groups of digital video channels are provided to N respective deformatters shown as deformatters 712A-712N (collectively the deformatters 712). The digital outputs or the deframer 708 and the deformatters 712 are provided to a converter 710 to represent the digital signals in an analog format. The output of the converter 710 is an analog broadband signal S(t) suitable for transmission to the homes 131 via the coaxial cables 132.

The digital node transmitter 127 accepts TDM data in a digital format and converts the TDM data into FDM data in an analog format. In one embodiment, the digital node transmitter 127 resides in the node 126. This provides the optimal signal quality in the digital CATV network. Information is transmitted through most of the digital CATV network, from the headend 106 to the node 126, in a digital format. Error-monitoring is inherent in the digital CATV network. Signal quality is high as there is no degradation in error-free digital data. At the same time, placing the digital node transmitter 127 in the node 126 optimizes the reliability of the digital CATV network by minimizing the distance information is transmitted in analog format. Finally, placing the digital node transmitter 127 as close to the homes 131 as economically feasible maximizes the number of POPs 118, 120, 122 in the digital CATV network where services can be added or dropped with ease.

The digital node transmitter 127 receives optical digital data that is transmitted serially through the fiber optic cable 130. The optical-to-electrical converter 702 transforms the optical digital data to electrical digital data for processing. The serial digital data at the output of the optical-to-electrical converter 702 is accumulated into parallel bits. In one embodiment, the serial bits are assembled into eight parallel bits to recover the eight-bit bytes that were converted to serial bits by the serializer 410 of the digital headend transmitter 113. The eight-bit bytes are then provided to the demultiplexer 706 to recover the individual analog video channels and the grouped digital video channels that were combined using TDM technology by the multiplexer 406 of the digital headend transmitter 113.

The individual analog video channels are provided to the deframer 708. The deframer 708 removes the extra bits appended to the raw data for error-monitoring and status indication in the digital CATV network. The digital outputs $Z_i[nT]$ of the deframer 708 are the same as the digital samples produced by the digitizer 402 of the digital headend transmitter 113. In one embodiment, the digitizer 402 produces an interleaved I and Q output and the deframer 708 de-interleaves the I and Q components for subsequent processing by the converter 710. The converter 710 unsamples the digital outputs of the deframer 708 to recover the analog format of each analog video channel.

The groups of digital video channels are provided to the respective deformatters 712 to separate into individual digital video channels, and to prepare the digital video channels for conversion to an analog format. The converter 710 converts the digital video channels from the digital format to the analog format. The converter 710 also combines the analog video channels and the digital video channels in their analog format into one analog broadband signal S(t) using FDM. The format of S(t) is identical to signals that are presently transmitted to the homes 131. Therefore, the digital CATV network can be seamlessly implemented. The existing set top box 134, adapter 138, and cable modem 142 in the homes 131 can still be used.

Figure 8:
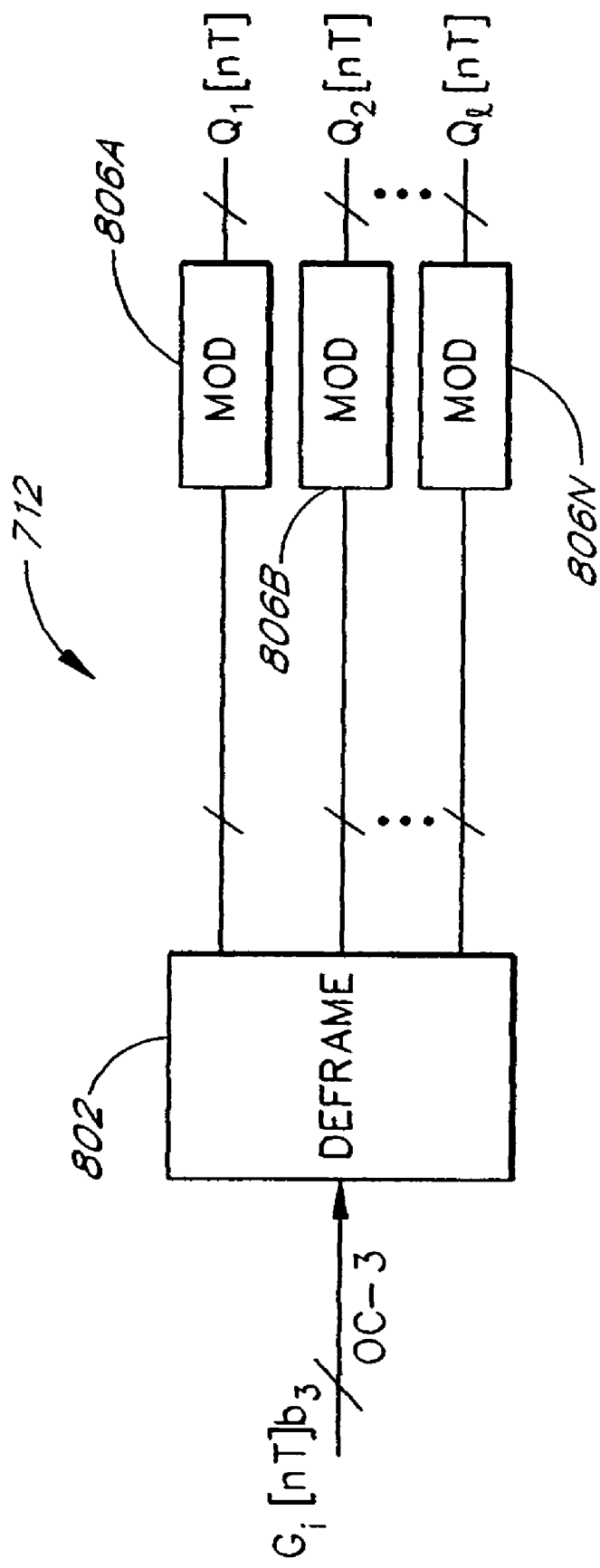
FIG. 8 is a block diagram of a deformatter in the digital node transmitter shown in FIG. 7.

FIG. 8 is a block diagram of one embodiment of the deformatters 712 in the digital node transmitter 127. Data $G_i[nT]$ in a digital format, representing a group of digital video channels, is provided to a deframer 802. N outputs of the deframer 802, representing N digital video channels, are provided to N respective modulators shown as modulators 806A-806N (collectively the modulators 806). The deframer 802 ungroups the digital video channels in addition to removing extra bits utilized for transport in the digital CATV network. Digital modulation is introduced by the modulators 806 to prepare the digital data for transmission in the analog format. Digital modulation schemes, including amplitude shift keying, phase shift keying and frequency shift keying, can be used. In one embodiment, quadrature amplitude modulation is employed.

Figure 9A:
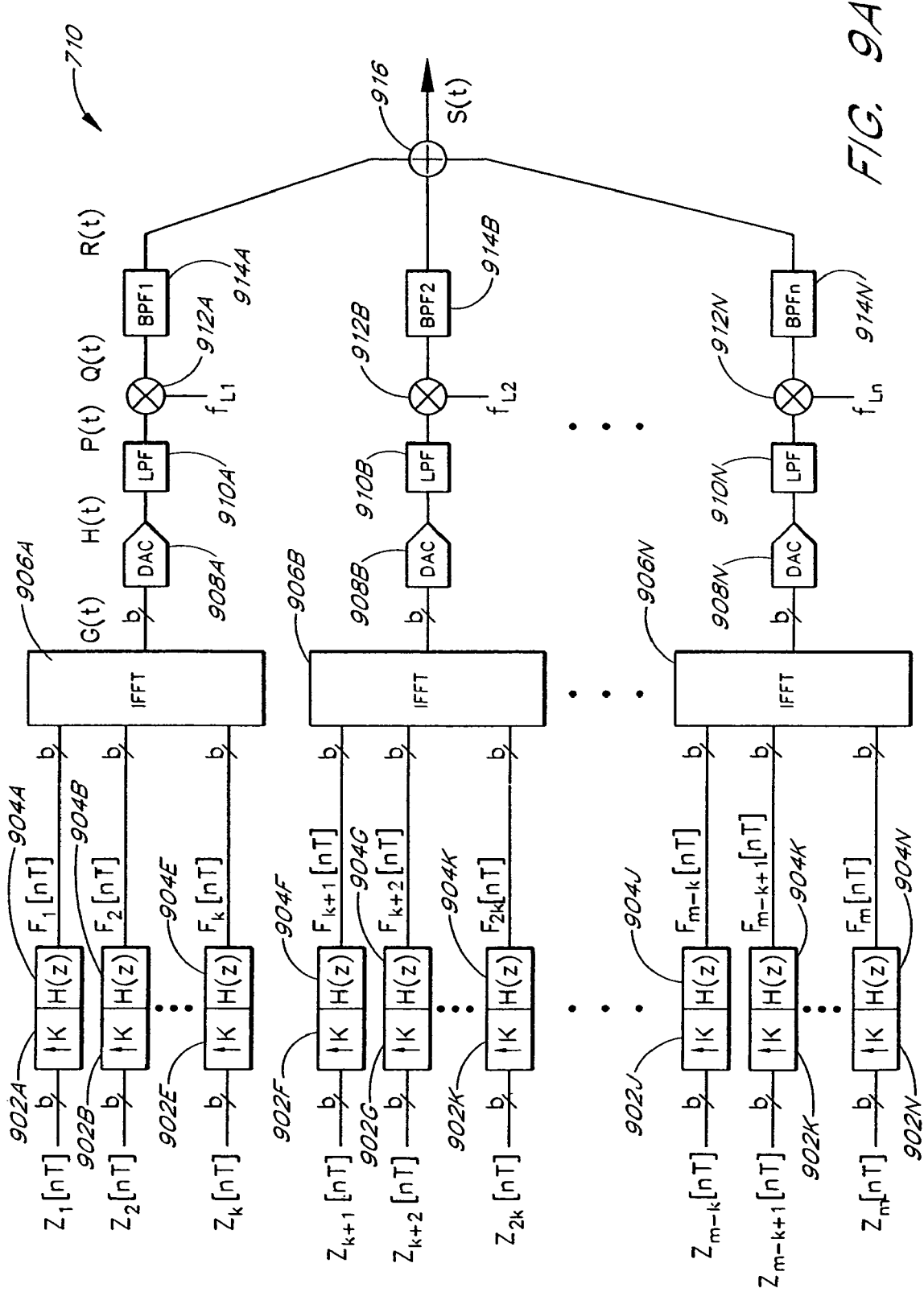
FIG. 9 (shown as 9A and 9B) is a block diagram of a converter in the digital node transmitter shown in FIG. 7, including frequency domain representation of waveforms at various points.
Figure 9B:
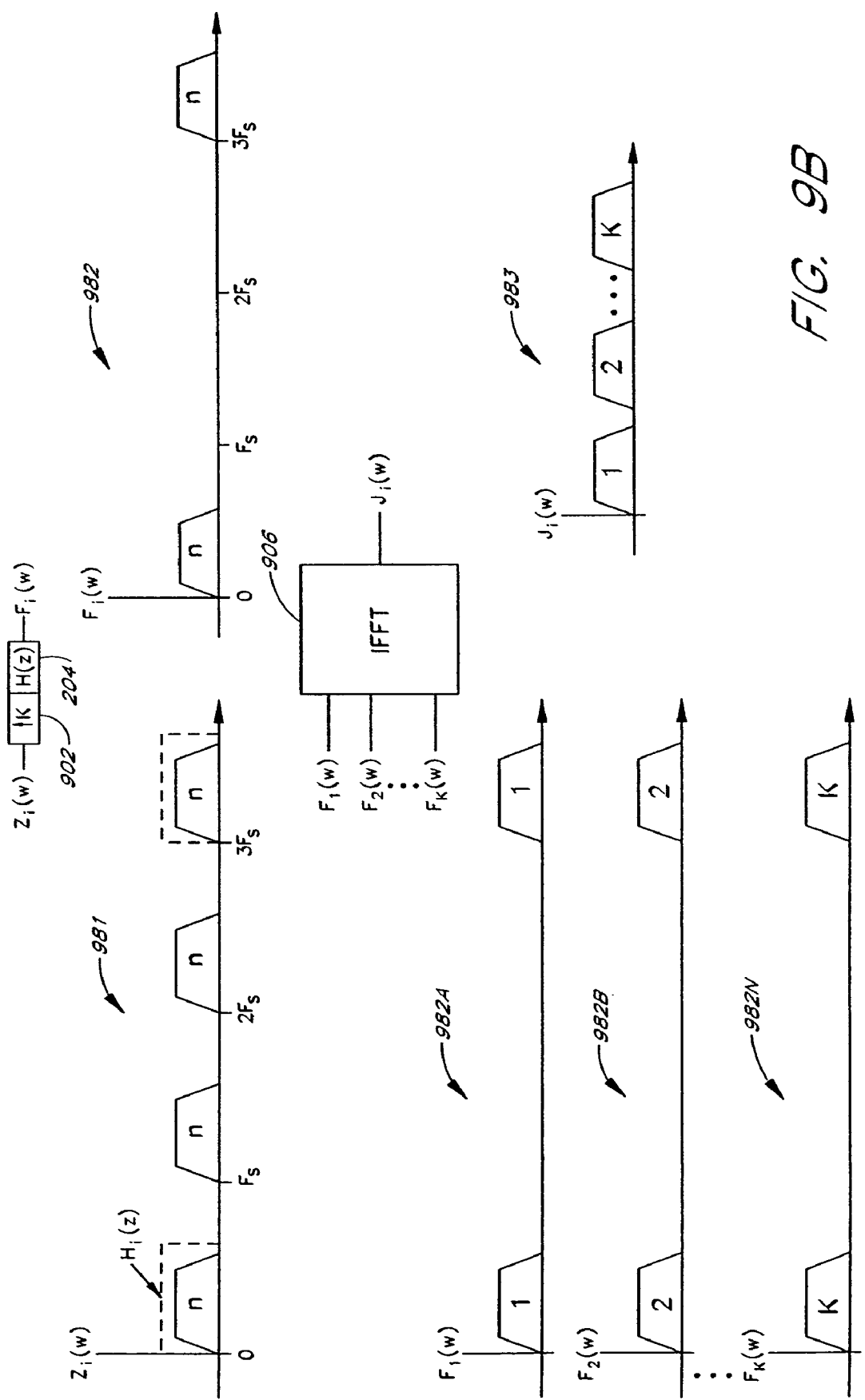

FIG. 9 (shown as 9A and 9B) is a block diagram of one embodiment of the converter 710 in the digital node transmitter 127 of FIG. 7. The digitized data $Z_i[nT]$ of analog video channels is provided to the converter 710. The digitally modulated data $Q_i[nT]$ of digital video channels can be similarly provided to the converter 710. The digital data of N analog or digital video channels are provided to N respective sample rate expanders shown as sample rate expanders 902A-902N (collectively the sample rate expanders 902) followed by N respective anti-imaging filters shown as anti-imaging filters 904A-904N (collectively the anti-imaging filters 904). Outputs $F_i[nT]$ from N groups of the anti-imaging filters 904 are combined by N respective digital frequency modulator blocks shown as digital frequency modulator blocks 906A-906N (collectively the digital frequency modulator blocks 906). The combined digital signals $J_i[nT]$ are provided to N respective DACs shown as DACs 908A-908N (collectively the DACs 908). The analog signals $K_i(t)$ at the output of the DACs 908 are provided to N respective LPFs shown as LPFs 910A-910N (collectively the LPFs 910). The outputs $P_i(t)$ of the LPFs 910 are provided to N respective upconverters shown as upconverters 912A-912N (collectively the upconverters 912). The outputs $Q_i(t)$ of the upconverters 912 are provided to N respective BPFs shown as BFPs 914A-914N (collectively the BFPs 914). A combiner 916 uses FDM technology to combine outputs in analog format from the BPFs 914 into one analog broadband signal S(t).

In one embodiment, the digital frequency modulator blocks 906 are Inverse Fast Fourier Transform (IFFT) blocks. The IFFT blocks 906 provide a more cost-efficient converter 710. Each IFFT block 906 combines a group of analog or digital video channels in the digital domain using FDM technology. Fewer DACs 908, LPFs 910, upconverters 912 and BPFs 914 are required. The sample rate expanders 902 and the anti-imaging filters 904 prepare the analog or digital video channels for combination without overlap. In one embodiment, the digital data of each analog or digital video channel is interpolated by an integer factor of K and passed through the anti-imaging filters 904. A spectral plot $Z_i[\omega]$ 981 shows that spectral images of the digital data repeat at multiples of the sampling frequency Fs. A spectral plot $F_i[\omega]$ 982 of the output of the anti-imaging filters 904 shows that interpolation by K and anti-image filtering effectively change the repetition rate to multiples of K times Fs. A spectral plot $J_i[\omega]$ 983 of the output of the IFFT blocks 906 illustrates the FDM of K analog or digital video channels. The upper limit on the number of channels that can be frequency-division multiplexed by the IFFT blocks 906 depends on the speed of the DACs 908. The higher speed DACs 908 allow the IFFT blocks 906 to frequency-division multiplex more analog or digital video channels. The LPFs 910 after the DACs 908 remove unwanted spectral images in the analog outputs of the DACs 908. The upconverters 912 and the BPFs 914 frequency shift the analog signal to a designated frequency carrier. Each group of channels is frequency shifted to a different frequency carrier. Multiple groups of channels are combined into one FDM signal S(t) for broadcast to the homes 131.

FIG. 10 illustrates a method to distribute computer network data (e.g., IP data) in the digital CATV network. Various sources (e.g., the headend 106, the nodes 126 or the external data networks 114) communicate the IP data to one of the nodes 126 or other POP 118, 120, 122. The POP 118, 120, 122 includes a process or 1010, one or more transceivers 1012, 1014, 1016, a bank of N modems shown as modems 1002A-1002N (collectively the modems 1002), N couplers shown as couplers 1004A-1004N (collectively the couplers 1004). Various sources communicate with the transceivers 1012, 1014, 1016. For example, the headend 106 communicates with the transceiver 1014, the nodes 126 communicate with the transceiver 1016, and the external data networks 114 communicate with the transceiver 1012. The transceivers 1012, 1014, 1016 communicate with the processor 1010. The processor 1010 communicates with the modems 1002. The modems 1002 communicate with respective couplers 1004. Video downstream data 1008 is broadcast to the couplers 1004. The couplers 1004 communicate with N respective locations shown as locations 1006A-1006N (collectively the locations 1006).

Downstream IP data is received by the transceivers 1012, 1014, 1016 from the various sources. The transceivers 1012, 1014, 1016 forward the downstream IP data to the processor 1010. Each packet of the IP data typically includes an address indicating its intended destination. The processor 1010 processes the downstream IP data and routes the downstream IP data to the appropriate modems 1002 according to the addresses of the respective packets. The modems 1002 forward the downstream IP data packets to the respective couplers 1004 which communicate the information to respective locations 1006. Each of the locations 1006 represents a group of homes 131 serviced by the digital CATV network.

Upstream IP data from the homes 131 can be provided to the digital CATV network for distribution. In addition to combining the video downstream data 1008 with the downstream IP data from the modems 1002 for transmission to the respective locations 1006, the couplers 1004 receive data from the respective locations 1006 and provide the upstream IP data to the modems 1002. The modems 1002 forward the upstream IP data to the processor 1010. The processor 1010 processes the upstream IP data and routes the IP data packets according to respective destination addresses. For example, the processor 1010 routes the IP data packet back to one of the modems 1002 as downstream IP data when the address indicates that the destination is one of the homes 131 serviced by that particular POP 118, 120, 122. Alternatively, the processor 1010 routes the IP data packet to the transceiver 1012 when the address indicates that the destination is one of the external data networks 114. The processor 1010 routes the IP data packet to the transceiver 1016 when the address indicates that the destination is one of the homes 131 serviced by another node 126 that is coupled to the POP 118, 120, 122. Finally, the processor 1010 routes the IP data packet to the transceiver 1014 when the address indicates one of the other destinations. The transceivers 1012, 1014, 1016 can be a combination of optical transceivers, electrical transceivers or wireless transceivers depending on whether fiber optic cables, coaxial cables or wireless links are used to couple the various sources to the transceivers 1012, 1014, 1016.

The modems 1002 facilitate the distribution of the IP data from various sources to the homes 131 and the transmission of the IP data between the homes 131 serviced by the digital CATV network. Both the upstream IP data and the downstream IP data are processed and routed by the processor 1010. By utilizing the bank of modems 1002 and corresponding couplers 1004, the IP data packets destined for the different locations 1006 can occupy the same time slot or frequency band. The effective bandwidth for the group of locations 1006 is increased.

FIG. 11 illustrates one embodiment of a method to add or drop information in a digital format. A network element 1102 receives a first bitstream 1110 for processing. The network element 1102 has N ports shown as ports 1104A-1104N (collectively the ports 1104). Information designated to be dropped from the first bitstream 1110 can be made available at one or more of the ports 1104. Information to be added to the first bitstream 1110 is made available to one of the ports 1104. The network element 1102 accesses the information that is to be dropped or inserted in the first bitstream 1110. Information from the first bitstream 1110 that is not dropped continues through the network element without requiring special pass-through units or other signal processing. The network element 1102 outputs a second bitstream 1112 that contains the information of the first bitstream 1110 without the dropped information but includes the inserted information. In one embodiment, the network element 1102 is a SONET Add/Drop Multiplexer (ADM). The ADM can consolidate information from many locations.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. A cable network point of presence, external to a cable headend location, comprising:
   a receiver adapted to receive a plurality of signals transmitted by a cable headend transmitter, wherein said signals are in a time division multiplexed format;
   a sample rate expander adapted to receive a plurality of signals derived from said plurality of time multiplexed signals;
   an anti-imaging filter adapted to receive an output of said sample rate expander;
   a transmitter co-located with said receiver for transmitting a plurality of modulated signals, derived from said plurality of time division multiplexed signals, to a first plurality of subscribers and a second plurality of subscribers, wherein:
     said transmitter comprises a plurality of quadrature amplitude modulators,
     said quadrature amplitude modulators are configured to frequency-division multiplex two or more signals derived from said plurality of time division multiplexed signals,
     said transmitter allocates bandwidth among said plurality of subscribers by adding or dropping at least one channel, and
   wherein said point of presence is at a location that is different from a location of said cable headend transmitter or locations of said first or second plurality of subscribers, wherein said first plurality of subscribers receives a first set of channels, wherein said second plurality of subscribers receives a second set of channels, and wherein, at a given moment in time, said first set of channels is different from said second set of channels.

2. The point of presence of claim 1 further comprising a deframer adapted to recover said plurality of time division multiplexed signals.

3. The point of presence of claim 1 wherein a lowpass filter is adapted to receive a plurality of frequency division multiplexed signals and wherein said lowpass filter is configured to pass a baseband frequency.

4. The point of presence of claim 3 wherein an upconverter is adapted to receive an output of said lowpass filter and frequency shift to a desired transmit frequency.

5. The point of presence of claim 4 wherein a transmit bandpass filter is adapted to receive an output of said upconverter, and wherein said transmit bandpass filter is configured to pass the desired transmit frequency.

6. The point of presence of claim 1 further comprising a receiver for receiving data from a data network external to said cable headend.

7. The point of presence of claim 6 wherein said data network is at least one of the Internet, a cellular network, a Public Switched Telephone Network, and a satellite network.

8. The point of presence of claim 6 wherein said data network transmits digital data directly to said point of presence without first transmitting said digital data to said headend.

9. The point of presence of claim 1 wherein said point of presence comprises at least one modem and wherein said modem increases effective bandwidth available to said first and second plurality of subscribers.

10. The point of presence of claim 1 wherein data packets destined for the first plurality of subscribers from said point of presence occupy a first time slot and wherein different data packets destined for a third plurality of subscribers from another point of presence occupy said first time slot.

11. The point of presence of claim 1 wherein data packets destined for the first plurality of subscribers from said point of presence occupy a first frequency band and wherein different data packets destined for a third plurality of subscribers from another point of presence occupy said first frequency band.

12. The point of presence of claim 1 wherein the transmitter further comprises an analog-to-digital converter configured to receive a plurality of analog signals and produce a plurality of digital signals.

13. The point of presence of claim 1 further comprising a receiver adapted to receive upstream data transmitted by the first plurality of subscribers or the second plurality of subscribers.

14. The point of presence of claim 13 wherein said upstream data occupies a first frequency band between 5 MHz and 45 MHz.

15. The point of presence of claim 1 wherein said plurality of signals transmitted by the cable headend transmitter comprises a digitized analog signal that occupies a second frequency band between 50 MHz and 550 MHz.

16. The point of presence of claim 15 wherein said plurality of signals transmitted by the cable headend transmitter comprise digital signals and occupy a third frequency band between 550 MHz and 750 MHz.

17. The point of presence of claim 16 wherein said plurality of signals transmitted by the cable headend transmitter are from an external data network and occupy a fourth frequency band between 800 MHz and 900 MHz.

18. The point of presence of claim 13 wherein said upstream data occupies a fifth frequency band between 900 MHz and 1 GHz.

* * * * *